US011740372B1

(12) United States Patent
Tian et al.

(10) Patent No.: US 11,740,372 B1
(45) Date of Patent: Aug. 29, 2023

(54) METHOD AND SYSTEM FOR INTELLIGENTLY IDENTIFYING CARBON STORAGE BOX BASED ON GAN NETWORK

(71) Applicant: Institute of Geology and Geophysics, Chinese Academy of Sciences, Beijing (CN)

(72) Inventors: Fei Tian, Beijing (CN); Jiangyun Zhang, Beijing (CN); Wang Zhang, Beijing (CN); Wenhao Zheng, Beijing (CN); Xiaocai Shan, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 4 days.

(21) Appl. No.: 17/945,002

(22) Filed: Sep. 14, 2022

(30) Foreign Application Priority Data

Aug. 2, 2022 (CN) .......................... 202210919669.5

(51) Int. Cl.
*G01V 1/28* (2006.01)
*G01V 1/30* (2006.01)

(52) U.S. Cl.
CPC .............. *G01V 1/282* (2013.01); *G01V 1/302* (2013.01); *G01V 1/306* (2013.01); *G01V 2210/62* (2013.01)

(58) Field of Classification Search
CPC ........ G01V 1/282; G01V 1/302; G01V 1/306; G01V 2210/62
See application file for complete search history.

(56) References Cited

U.S. PATENT DOCUMENTS

| 11,226,423 B1* | 1/2022 | Gao | G01V 1/282 |
| 11,320,551 B2* | 5/2022 | Liu | G01V 1/282 |
| 11,520,077 B2* | 12/2022 | Denli | G01V 1/28 |

FOREIGN PATENT DOCUMENTS

| CN | 108986835 A | 12/2018 |
| CN | 109242090 A | 1/2019 |
| CN | 113688953 A | 11/2021 |

OTHER PUBLICATIONS

Vincent J. Murphy, Seismic Velocity Measurements for Offshore Dredging and Marine Facilities, May 5, 1974, Offshore Technology Conference,, OTC-2131-MS, ISBN 978-1-55563-634-0, pp. 997-1001 (Year: 1974).*

(Continued)

*Primary Examiner* — Mischita L Henson
(74) *Attorney, Agent, or Firm* — Nitin Kaushik

(57) ABSTRACT

The present disclosure belongs to the field of capture, utilization, and storage of carbon dioxide, particularly relates to a method and system for intelligently identifying a carbon storage box based on a GAN network, and aims at solving the problem that the analysis accuracy of a fault zone area in the prior art is insufficient. The method comprises the steps: delineating seismic waveform data of a stable sedimentary area through a GAN network, and removing seismic waveform data points in the fault zone area; obtaining a stable sedimentary background seismic waveform data invertomer; obtaining a three-dimensional wave impedance prediction data volume; making a difference to obtain an abnormal wave impedance data volume; retaining abnormal wave impedance data of fault-karst in the three-dimensional variance attribute volume to obtain a fault-karst wave impedance data volume; and then obtaining a carbon storage box interpretation model.

9 Claims, 10 Drawing Sheets

(56) References Cited

OTHER PUBLICATIONS

Gavin H. Graham et al., Bayesian Inversion Of Generative Models For Geologic Storage of Carbon Dioxide, 2019, Second Workshop on Machine Learning and the Physical Sciences (NeurIPS 2019), Vancouver, Canada, pp. 1-5 (Year: 2019).*

Mingliang Liu et al., 3D Seismic Facies Classification using Convolutional Neural Network and Semi-supervised Generative Adversarial Network, 2019, SEG International Exposition and 89th Annual Meeting, pp. 4995-4999 (Year: 2019).*

* cited by examiner

METHOD AND SYSTEM FOR INTELLIGENTLY IDENTIFYING CARBON STORAGE BOX BASED ON GAN NETWORK

CROSS-REFERENCE TO RELATED APPLICATIONS

The application claims priority to Chinese patent application No. 2022109196695, filed on Aug. 2, 2022, the entire contents of which are incorporated herein by reference.

TECHNICAL FIELD

The present disclosure belongs to the field of capture, utilization, and storage of carbon dioxide, and particularly relates to a method and system for intelligently identifying a carbon storage box based on a GAN network.

BACKGROUND

At present, the excessive emission of greenhouse gases has led to serious climate problems. Great attention has been paid to how to control greenhouse gas emission and achieve sustainable development effectively and quickly. Carbon capture, utilization, and storage (CCUS) have become a hot technology to solve this problem.

The natural storage environment of oil and gas fields provides a new idea for $CO_2$ storage. It has greatly promoted the research progress in the field of oil and gas exploration. Carbon dioxide injected into oil and gas reservoirs is generally stored in rock pores in molecular form, and is dissolved in formation water in dissolved form, or reacts with minerals to generate compounds that are stored in strata for a long time.

For carbon dioxide storage in oil and gas reservoirs, economic conditions should be considered at first. Compared with traditional re-fracturing, injecting $CO_2$ into the oil and gas reservoirs has been proven to be able to store carbon at a lower cost, has a positive impact on the output of oil and gas wells nearly discarded, and significantly prolongs their life cycle. At the same time, it is necessary to consider the storage capacity of reservoir space. From the perspective of safety, it is required that the trap structure of a geological body is good, that is, the lithology, thickness, and continuity of cap rock are good. The geological structure of the basin is the best, it should be far away from active volcano development zones and seismic zones, and geological environments are stable, thereby ensuring the stability of storage environments and preventing the occurrence of environmental risk accidents.

In recent years, the exploration and development results of fractured-vuggy oil and gas reservoirs show that the underground flow of oil and gas is closely related to deep fractures, and it often accumulates in karst areas controlled by fault cores and fault fracture zones along faults, and forms a good trap under the sealing effect of overlying marl or surrounding rock. The concept of "fault-controlled karst reservoir" is a great breakthrough in the geological theory of a fractured-vuggy reservoir, and provides a new idea for the research area of marine carbonate rock carbon storage.

SUMMARY

In order to solve the above problems in the prior art that the prior art fails to identify the disturbance of fault zones to seismic waveforms, the analysis precision of fault zone areas is insufficient, so it is difficult to analyze $CO_2$ storage conditions in the fault zone areas, the present disclosure provides a method for intelligently identifying a carbon storage box based on a GAN network, which comprises:

obtaining pre-stack single-shot seismic data and well logging data, then obtaining a near-well geological interpretation result, performing pre-stack time migration and superposition on the pre-stack single-shot seismic data to obtain post-stack seismic data;

building an isochronous stratigraphic framework model of a target horizon based on the post-stack seismic data;

performing well-to-seismic calibration on the post-stack seismic data and the well logging data to obtain a time-depth conversion relationship;

calculating a three-dimensional variance attribute volume based on the post-stack seismic data, delineating seismic waveform data of a stable sedimentary area, and removing seismic waveform data points in a fault zone area to obtain stable sedimentary background waveform data;

based on the stable sedimentary background waveform data, through a generator of a background waveform data filling model based on the GAN neural network, obtaining fine stable sedimentary background seismic waveform data, and then obtaining a fine stable sedimentary background seismic waveform data invertomer, wherein the background waveform data filling model based on the GAN neural network is built by a generator and discriminator;

based on the well logging data, the post-stack seismic data and the time-depth conversion relationship, obtaining a three-dimensional wave impedance prediction data volume through a wave impedance value prediction model based on a cross-well seismic waveform structure;

calculating the difference between the fine stable sedimentary background seismic waveform data invertomer and the three-dimensional wave impedance prediction data volume to obtain an abnormal wave impedance data volume;

by removing areas lower than the average value in the three-dimensional variance attribute volume, retaining the abnormal wave impedance data in the spatial geometric contour of the fault zone to obtain a carbon storage box wave impedance data volume including the geometric structure and internal wave impedance characteristics of a carbon storage box;

comparing the near-well geological interpretation result with the carbon storage box wave impedance data volume, delineating a characteristic value interval of a hole reservoir bed, a characteristic value interval of a transition zone, and a characteristic value interval of surrounding rock, and obtaining a carbon storage box interpretation model; and based on the carbon storage box interpretation model, obtaining the dredging situation of the carbon storage box, and then obtaining the carbon sequestration box evaluation.

Further, a method of obtaining the post-stack seismic data comprises:

based on the single-shot seismic data, performing denoising to obtain denoised seismic data, which specifically comprises:

encoding the single-shot seismic data by a convolution antoencoder, extracting hidden characteristics;

the convolution antoencoder is:

$$h''_k = f(W_{k1} * x + b_{k1}),$$

where, x represents the single-shot seismic data, a convolution layer extracts hidden characteristics of the single-shot seismic data through multiple convolution kernels, $W_{k1}$ represents a weight matrix of a k1-th convolution kernel, $b_{k1}$ represents the offset of the k1-th convolution kernel, * represents convolution operation, $f$ represents a pooling function of the encoder, and $h''_{k1}$ represents the hidden characteristics extracted by the k1-th convolution kernel;

decoding and rebuilding the hidden characteristics by the decoder:

$$\hat{x}\Sigma_H(W'_{k2}*g(h''_{k2})+b'_{k2}),$$

where, g represents a sampling function on the decoder, $W'_{k,2}$ represents a weight matrix of a k2-th convolution kernel in the decoder, $b'_{k2}$ represents the offset of the k2-th convolution layer, and the decoder decodes and rebuilds the hidden characteristics, and merges rebuilt results into denoised seismic data; and performing pre-stack time migration and superposition on the denoised seismic data to obtain the post-stack seismic data.

Further, a method of obtaining the time-depth conversion relationship comprises:

based on the post-stack seismic data, tracing peak points of a reflection event, constructing a continuous surface of the reflection event, and then determining the reflection event where the marker layer is located to build the isochronous three-dimensional distribution of the marker layer;

performing product operation based on a sonic time difference curve and a density curve in the well logging data of each known well site to obtain a wave impedance curve, and further calculating a reflection coefficient curve;

building a Ricker wavelet on the basis of the main seismic frequency of a target interval, and performing convolution calculation of the Ricker wavelet and the reflection coefficient curve to obtain a synthetic seismic record;

making the depth data of the maker layer at a wellbore of each drilling well position model correspond to a three-dimensional distribution model of the maker layer, calculating the correlation between the synthetic seismic record and the post-stack seismic data of a seismic trace near the well, and when the waveform correlation is higher than the first correlation threshold, the well-to-seismic calibration is completed to finally obtain the time-depth conversion relationship between the well logging depth and the two-way travel time of seismic reflection waves;

$$T_d = T_{H_0} + 2\sum_{i=1}^{n} T_i \cdot \Delta H,$$

where, $T_{H_o}$ represents the two-way travel time of the seismic data corresponding to the depth of a sonic well logging marker layer; $T_i$ represents sonic time difference; $\Delta H$ represents a well logging curve data sampling interval; and $T_d$ represents the two-way travel time of a seismic wave.

Further, a method of obtaining the seismic waveform data of the stable sedimentary area comprises:

based on the post-stack seismic data, calculating the seismic waveform variance attribute data volume;

letting the data of each sampling point in the post-stack seismic data be $S_{ijk}$, p represents a seismic gird wire size, q represents a seismic grid trace number, and k represents a sampling point serial number of a seismic record sampled at 1 ms;

calculating a mean square error of sampling point data in a preset sampling area:

$$Q_{pqk} = \sum_{p-1}^{p+1}\sum_{q-1}^{q+1}\sum_{k-1}^{k+1}\left(S_{pqk} - 1/9\sum_{p-1}^{p+1}\sum_{q-1}^{q+1}\sum_{k-1}^{k+1} S_{pqk}\right)^2$$

translating the sampling areas vertically and horizontally, transversely calculating the data mean square errors of all the sampling areas to obtain a three-dimensional variance attribute volume; and slicing the three-dimensional variance attribute volume, obtaining the distribution characteristics of variance attribute data on a plane, and taking the area where the variance attribute value is lower than the total energy average value as the sedimentary stable area, wherein data corresponding to the sedimentary stable area is the stable sedimentary background seismic waveform data.

Further, the background waveform data filling model based on the GAN neural network specially comprises:

a generator and a discriminator;

wherein the generator comprises four groups of down-sampling convolution layers and pooling layers, a full connection layer and four up-sampling convolution layers, and four kinds of convolution kernels with the scale of 5×5 are used in each down-sampling convolution layer; and the discriminator comprises four up-sampling convolution layers.

Further, a training method of the background wave impedance data filling model based on the GAN neural network comprises:

based on the stable sedimentary background waveform data, generating stable sedimentary background characteristics by the generator;

extracting stable sedimentary background waveform data by the encoder in the generator, specifically, calculating abstract characteristic representation by the four groups of down-sampling convolution layers and pooling layers;

classifying, integrating, and normalizing abstract characteristic representation to retain the resolution and number of characteristic graphs through the full connection layer to obtain a normalized characteristic image;

collecting missing data of the normalized characteristic image by the decoder, specifically, performing weighted up-sampling by the four up-sampling convolution layers to obtain stable sedimentary background characteristics with the same scale as the stable sedimentary background waveform data, namely fine stable sedimentary background seismic waveform data;

inputting the seismic waveform data of the stable sedimentary area and the seismic waveform data of the fine stable sedimentary area, which are not processed by the generator and jointly serve as data to be identified, into the discriminator, wherein the discriminator judges whether the input data is the seismic waveform data of the fine stable sedimentary area and calculates discrimination accuracy;

in the training process, setting an objective function of the background wave impedance data filling model based on the GAN neural network as follows:

$$\min_G \max_D V(D, G) = E_{x \sim P_{data(x)}}[\log D(x)] + E_{v \sim P_v(v)}[\log(1 - D(G(v)))],$$

where, x represents waveform amplitude in the data $P_{data(x)}$ to be identified, v represents a random noise vector, $P_v(v)$ represents the probability distribution of a random noise vector, and is set as Gaussian distribution here, E represents an expected value, log represents taking the logarithm, min represents taking the minimum, max represents taking the maximum, D represents the discriminator, and G represents the generator;

setting an objective function $\mathrm{Obj}^D(\theta_D, \theta_G)$ of the discriminator as:

$$\mathrm{Obj}^D(\theta_D, \theta_G) = -E_{x \sim P_{data(x)}}[\log D(x)] - E_{z \sim P_z(z)}[\log(1-D(G(v)))],$$

setting an objective function of the generator as:

$$\mathrm{Obj}^G = \log(1 - D(G(v))),$$

alternately iterating the maximization of the objective function of the discriminator and the minimization of the objective function of the generator until the classification accuracy of the discriminator for the seismic waveform data of the fine stable sedimentary area output by the generator and the seismic waveform data of the stable sedimentary area not processed by the generator is lower than a preset threshold, and obtaining the trained background wave impedance data filling model based on the GAN neural network.

Further, a method of obtaining the fine stable sedimentary background seismic waveform data invertomer comprises:

delineating grids with preset sizes based on the sedimentary stable area, and taking each grid node as a virtual well site;

letting an unknown underground wave impedance model parameter m be a g-dimensional space vector $m = \{m_1, \ldots, m_g\}$ based on the stable sedimentary background seismic waveform data;

obtaining the observation data d as a r-dimensional data vector $d = \{d_1, \ldots, d_r\}$ through an earthquake acquisition process;

through a nonlinear function kernel G, establishing an unknown underground wave impedance model parameter, and establishing the relationship between the parameter and the r-dimensional data vector to obtain a forward model:

$$d = G(m) + n$$

where, $n = \{n_1, \ldots, n_r\}$ represents random noise independent of the underground wave impedance model parameter m, which obeys Gaussian distribution;

building an inversion objective function based on the forward model:

$$\min F[d, G(m)] = \min \|d, G(m)\|_2^2,$$

where, F is a mean square error between the observation data d and the prediction data G(m);

performing linearized solution on the inversion objective function;

performing Taylor expansion on the forward model and omitting higher-order terms of more than quadratic to obtain a brief expression of prediction data:

$$\Delta G(m) = G(m) - G(m^0) = A \Delta m = A(m - m^0),$$

where, $m^0$ represents the initial model established according to prior information, A is a Jacobian matrix, and the element of A is first-order partial differential $\partial G_i / \partial m_j$;

letting $d_0 = G(m_0) + \xi$, $\Delta d = -d_0$, then the iterative equation of the forward model is:

$$m^{t+1} = m^t + \Delta m$$

where, $m^k$ represents the forward model after iteration t times, $m^{k+1}$ represents the forward model after iteration k+1 times, and $d_0$ is the noise-adding prediction data;

obtaining pre-stack depth and an offset seismic profile d' through one seismic acquisition process, assuming that inversion depth domain model parameters have prior probability distribution P(M=m), according to Bayesian formula, the probability distribution is as follows:

$$P(M = m \mid D = d) = \frac{P(D = d \mid M = m) P(M = m)}{P(D = d)},$$

the probability distribution of adding random noise is follows:

$$P(D = d \mid M = m) =$$

$$P(n) = \frac{1}{(2\pi)^{\frac{n}{2}} |\det C_n|^{\frac{1}{2}}} \exp\{-[d - G(m)]^T C_n^{-1} [d - G(m)]\},$$

where, $C_n$ is a noise covariance matrix, $C_n^{-1}$ is the inversion operation of the noise covariance matrix, and det is the determinant of the corresponding matrix;

n is noise and obeys Gaussian distribution, the average value is 0, $C_n$ is an equivalent diagonal matrix, and diagonal elements are the variance $\sigma_n^2$ containing noise of data center, then the probability distribution of adding the random noise is deformed as follows:

$$P(D = d \mid M = m) = \prod \frac{1}{(2\pi)^{\frac{n}{2}} \sigma_n} \exp\{-\sigma_n^2 \sum [d - G(m)]^2\},$$

for the prior probability distribution P(M=m) of the inversion depth domain model parameter, setting the initial model $m^0$, there is $m = m^0 + \Delta m$, and the probability distribution of the equivalent depth domain model is: $P(M=m) = P(m = m^0 + \Delta m) = P(\Delta m = m - m^0)$;

letting the probability distribution of the equivalent depth domain model obey Gaussian distribution, and the probability distribution of the depth domain model with the random noise added is:

$$P(M - m) = \frac{1}{(2\pi)^{\frac{n}{2}} |\det C_{\Delta m}|^{1/2}} \exp\{-[m - m^0]^T C_{\Delta m}^{-1} [m - m^0]\}$$

assuming that the average value of the depth domain model parameters is equal to an initial model $m^0$, they do not affect each other, and there is a simplified probability distribution of the depth domain model, which is as follows:

$$P(M - m) = \frac{1}{(2\pi)^{\frac{n}{2}} \sigma_m} \exp\{-\sigma_m^2 [m - m^0]\},$$

where, $\sigma_m$ represents the variance value of the real model relative to a given initial model;

a denominator P(D=d) in the probability distribution deformation with the random noise added depends on data acquisition and processing, and is set as a constant, and maximizing posterior probability is equivalent to maximizing a numerator, which maximizes posterior probability distribution:

$$P(M = m \mid D = d) =$$

$$\prod \frac{1}{(2\pi)^n \sigma_n \sigma_m} \exp\{-\sigma_n^{-2} \sum [d - G(m)]^2 - \sigma_m^2 \sum [m - m^0]^2\},$$

making the maximum equivalent formula of posterior probability distribution as:

$$F(m)=\sigma_n^{-2}\Sigma[d-G(m)]^2+\sigma_m^2\Sigma[m-m^0]^2\to 0,$$

letting the partial derivative of the model parameter m equal to zero, and $G(m)=G(m^0)+A\Delta m$, $\Delta m=m-m^0$, thereby obtaining the matrix equation:

$$\frac{\partial F(m)}{\partial m}=\sigma_n^{-2}[d-G(m^0)-A\Delta m]IA-\sigma_m^2 I\Delta m=0$$

$$dI\sigma_n^{-2}A-\sigma_m^2 I\Delta m-G(m^0)\sigma_n^{-2}IA-A\Delta m I\sigma_n^{-2}A=0,$$

where, $$A_{ij}=\frac{\partial G_i}{\partial m_j},$$

I is an identity matrix, $\Delta m$ is a wave impedance iterative matrix, arranging to obtain the basic formula of random inversion as follows:

$$[d-G[m^0]]A=[AA^T+\sigma_n^2\sigma_m^{-2}I]\Delta m \quad \Delta m= [AA^T+\sigma_n^2\sigma_m^{-2}I]^{-1}A^T[d-G(m^0)],$$

the iterative formula of the basic formula of random inversion is: $m^{k+1}=m^k+\Delta m$;

where, $G[m^0]$ is a depth domain synthetic seismic record formed by a parametric model, and d is observation data;

updating the parameters of the unknown underground wave impedance model through continuous iteration until positive and negative shocks occur in $\Delta m$, where, m is low frequency wave impedance inversion data;

based on the correlation between the plane coordinates of the virtual well site and the plane coordinates of the seismic data, further determining the one-to-one correspondence between the virtual well and the low-frequency wave impedance inversion data, and then assigning the low frequency wave impedance inversion data beside the virtual well to the virtual well to obtain the wave impedance data of the virtual well site; and based on the wave impedance inversion data volume, extracting the wave impedance data of the virtual well site, setting a calculation area as the whole range of a work area in a geological framework according to the interpolation calculation of all virtual well wave impedance data in the time window range defined by a stratigraphic framework to obtain a fine stable sedimentary background seismic waveform data invertomer.

Further, a method of obtaining the three-dimensional wave impedance prediction data volume comprises:

based on an acoustic time difference curve in well logging data, obtaining the propagation velocity of seismic waves by unit conversion;

determining the main frequency of an earthquake according to the frequency spectrum peak of the seismic waveform data of the target horizon in the post-stack seismic data;

calculating the wavelength of the seismic wave:

$$L=v/f_{main}$$

where, L represents the wavelength of the seismic wave, v represents the velocity of the seismic wave in a target interval, and $f_{main}$ represents the main frequency of the seismic wave;

according to the coordinates of the well site and the plane coordinates of the seismic data, matching the well logging acoustic time difference curve with the near-well seismic waveform corresponding to the density period;

taking the half-wavelength $$\frac{L}{2}$$

of the seismic wave as me length of a sliding time window and the step length as 1, extracting all seismic waveform amplitude data points in the sliding time window as seismic waveform amplitude samples;

extracting multiple samples in the same well to obtain a seismic waveform amplitude sample set;

inputting the seismic waveform amplitude sample set into a wave impedance value prediction model based on a cross-well seismic waveform structure to obtain a three-dimensional wave impedance prediction data volume;

wherein the wave impedance value prediction model based on the cross-well seismic waveform structure comprises an input layer, a hidden layer and an output layer;

the number of neurons in the input layer is the same as the number of data points in the seismic waveform amplitude sample set;

the hidden layer is built based on a fully connected structure:

the input of the p-th neuron in the Layer-th layer is equal to the neuron in the Layer-1-th multiplied by the weight plus an offset vector:

$$z^{Layer}{}_p=\Sigma_q \text{weight}^{Layer}{}_{pq}a^{Layer-1}{}_q+b^{Layer}{}_p,$$

the output of the p-th neuron in the Layer-th layer is expressed as:

$$a^{Layer}{}_p=\sigma(\Sigma_q \text{weight}^{Layer}{}_{pq}a^{Layer-1}{}_q+b^{Layer}{}_p,$$

σ represents an activation function, $a_k^{Layer-1}$ represents the output of the q-th neuron in the Layer-1-th layer, and $\text{weight}_{pq}^{Layer}$ Layer represents the connection weight between the p-th neuron in the Layer-th layer and the q-th neuron in the previous layer;

$$\sigma(\varepsilon)=\begin{cases}\varepsilon, & \varepsilon\geq 0 \\ p\varepsilon, & \varepsilon<0\end{cases}$$

σ represents a neural network hyperparameter the number of the neurons in the output layer is the same as that in the input layer, and the output layer outputs wave impedance values corresponding to the seismic waveforms, which are merged into the three-dimensional wave impedance prediction data volume.

Further, a training method of the wave impedance value prediction model based on the cross-well seismic waveform structure comprises:

obtaining a training data set and performing forward propagation:

$$z^l=w^l a^{l-1}+b^l a^l=\sigma(z^l),$$

where, the cost function is:

$$C=\frac{1}{2}\sum_j(y_j-a_z^l)^2,$$

$y_j$ represents a true value;

the error in the forward calculation of each layer of neural network is:

$$\delta_j^l = \frac{\partial C}{\partial z_j^l} = \sum_k \frac{\partial C}{\partial z_k^{l+1}} \frac{\partial z_k^{l+1}}{\partial a_j^l} \frac{\partial a_j^l}{\partial z_j^l} = \sum_k \delta_k^{l+1} \frac{\partial \left(w_{kj}^{l+1} a_j^l + b_k^{l+1}\right)}{\partial a_j^l} \cdot \sigma'(z_j^l) =$$

$$\sum_k \delta_k^{l+1} \cdot w_{kj}^{l+1} \cdot \sigma'(z_j^l) = \left((w^{l+1})^T \delta^{l+1}\right) \odot \sigma'(z^l),$$

the gradient of weight, that is, the partial derivative of the objective function to the weight, is:

$$\frac{\partial C}{\partial w_{jk}^l} = \frac{\partial C}{\partial z_j^l} \cdot \frac{\partial z_j^l}{\partial w_{jk}^l} = \delta_j^l \cdot \frac{\partial \left(w_{jk}^l a_k^{l-1} + b_j^l\right)}{\partial w_{jk}^l} = a_k^{l-1} \delta_j^l$$

the gradient of the offset, that is, the derivative of the offset by the objective function:

$$\frac{\partial C}{\partial b_j^l} = \frac{\partial C}{\partial z_j^l} \cdot \frac{\partial z_j^l}{\partial b_j^l} = \delta_j^l \cdot \frac{\partial \left(w_{jk}^l a_k^{l-1} + b_j^l\right)}{\partial b_j^l} = \delta_j^l,$$

the error in forward propagation is:
$\delta^L = \nabla_a C \odot \sigma'(Z^L)$, the error in back propagation is:
$\delta^l = ((w^{l+1})^T \delta^{l+1}) \odot \sigma'(z^l)$, updating parameters by a gradient descending method:

$$w^l \to w^l - \frac{\eta}{m} \sum_x \delta^{x,l} (a^{x,l-1})^T$$

$$b^l \to b^l - \frac{\eta}{m} \sum_x \delta^{x,l},$$

repeatedly iterating until the error is lower than the preset error threshold or preset iteration times are reached, and obtaining the trained wave impedance value prediction model based on the cross-well seismic waveform structure.

Further, a system for intelligently identifying a carbon storage box based on a GAN network, comprising:

a seismic data preprocessing module configured for obtaining pre-stack single-shot seismic data and well logging data, then obtaining the near-well geological interpretation result, performing pre-stack time migration and superposition on the pre-stack single-shot seismic data to obtain post-stack seismic data;

an isochronous stratigraphic framework model obtaining module configured for building the isochronous stratigraphic framework model of the target horizon based on the post-stack seismic data;

a time-depth conversion relationship obtaining module configured for performing well-to-seismic calibration on the post-stack seismic data and the well logging data to obtain a time-depth conversion relationship;

a stable sedimentary area obtaining module configured for calculating a three-dimensional variance attribute volume based on the post-stack seismic data, delineating seismic waveform data of a stable sedimentary area, and removing seismic waveform data points in a fault zone to obtain stable sedimentary background waveform data;

a stable sedimentary background seismic waveform data invertomer obtaining module configured for based on the stable sedimentary background waveform data, through a generator of a background waveform data filling model based on the GAN neural network, obtaining fine stable sedimentary background seismic waveform data, and then obtaining a fine stable sedimentary background seismic waveform data invertomer, wherein the background waveform data filling model based on the GAN neural network is built by a generator and discriminator;

a three-dimensional wave impedance prediction data volume obtaining module configured for based on the well logging data, the post-stack seismic data and the time-depth conversion relationship, obtaining a three-dimensional wave impedance prediction data volume through a wave impedance value prediction model based on a cross-well seismic waveform structure;

an abnormal wave impedance data volume obtaining module configured for calculating the difference between the fine stable sedimentary background seismic waveform data invertomer and the three-dimensional wave impedance prediction data volume to obtain an abnormal wave impedance data volume;

a carbon storage box wave impedance data volume obtaining module configured for by removing areas lower than the average value in the three-dimensional variance attribute volume, retaining the abnormal wave impedance data in the spatial geometric contour of a fault zone to obtain a carbon storage box wave impedance data volume including the geometric structure and internal wave impedance characteristics of a carbon storage box;

a model interpretation module configured for comparing the near-well geological interpretation result with the carbon storage box wave impedance data volume, delineating a characteristic value interval of a hole reservoir bed, a characteristic value interval of a transition zone, and a characteristic value interval of surrounding rock, and obtaining a carbon storage box interpretation model; and based on the carbon storage box interpretation model, obtaining the dredging situation of the carbon storage box, and then obtaining the carbon storage box evaluation.

The present disclosure has the following beneficial effects:

firstly, the additive white noise of the post-stack seismic data is removed by a self-encoder algorithm. The rich geological information of the seismic waveforms is retained. A neural network model is designed according to the slight changes in different geological characteristics reflected by the seismic waveforms, can not only restore sedimentary background seismic waveform reflection characteristics in the fault zone area, but also establish the nonlinear relationship between seismic waveform change characteristics and wave impedance information. The distribution law of various geological bodies can be determined through comparison and analysis of the seismic waveform obtained from a generative model and the actual seismic waveform by taking the wave impedance as the difference characteristics of karst caves, fractures, and surrounding rock in fault-controlled karst reservoirs, and thus, data support is provided for further analysis of reservoir connectivity.

At present, a carbon dioxide displacement and storage technology has improved the economic benefits of carbon storage. Carbon dioxide is injected into oil wells that are still in production. Carbon dioxide and crude oil form a mixture through high-pressure injection. Oil is displaced while carbon dioxide is stored, and a crude oil production rate is increased by increasing a crude oil recovery rate. Therefore, the present disclosure can assist the application of this technology in the fault-controlled karst reservoirs, makes clear the distribution of underground fault-karst and fracture zones, carries on geological research on underground flow performance of carbon dioxide, evaluates the dredging performance of carbon dioxide, and provides monitoring means for leakage risk after carbon dioxide storage.

DETAILED DESCRIPTION

Figure 1A:
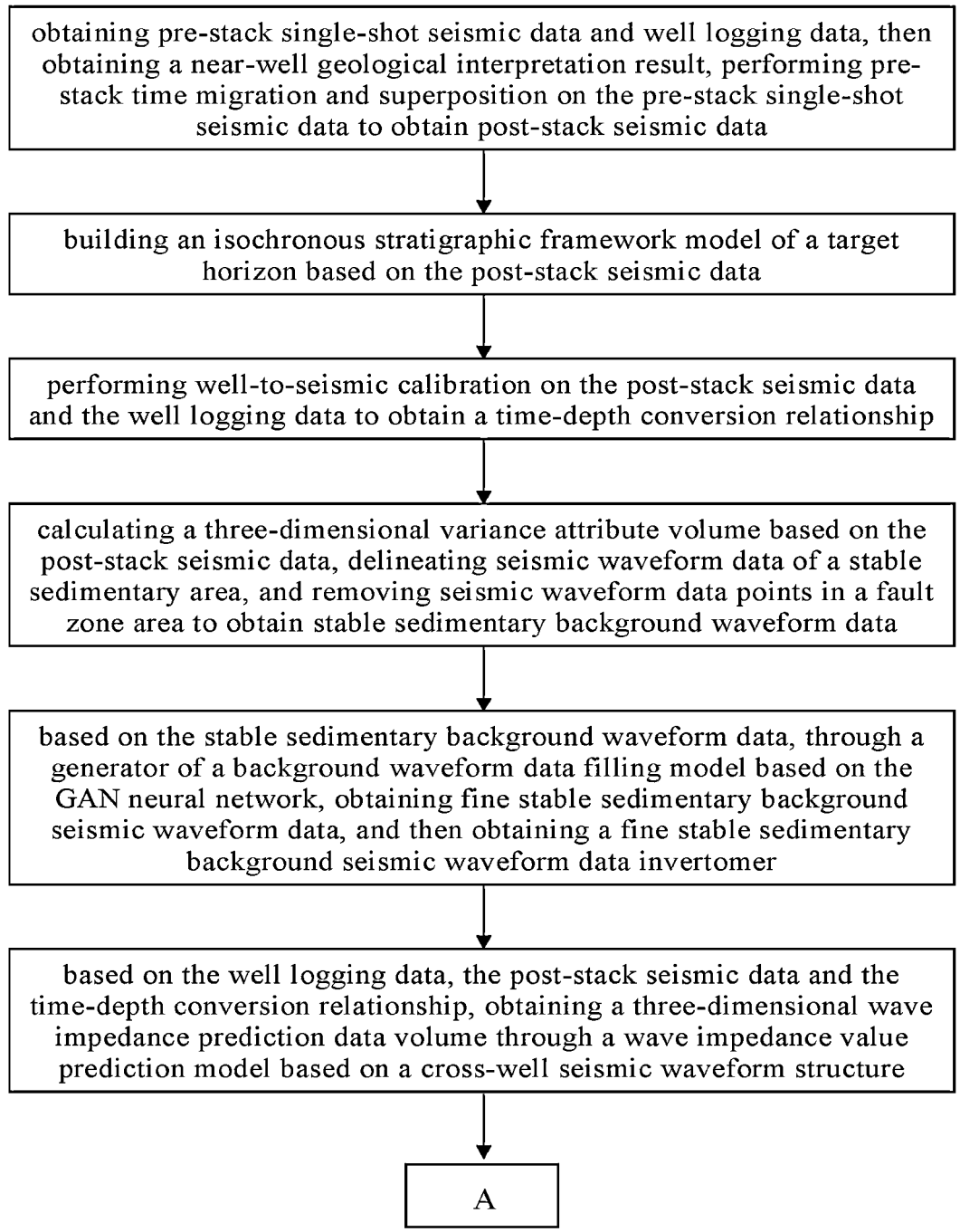
FIG. 1A and FIG. 1B is a flow schematic diagram of a method for identifying a carbon storage box based on a GAN network according to an embodiment of the present disclosure.

The present application is further described below in combination with the drawings and embodiments. It may be understood that the specific embodiments described herein are only used for explaining the present disclosure rather than limiting the present disclosure. In addition, it should be stated that in order to facilitate the description, only a part related to the present disclosure is illustrated in the drawings.

It should be stated that in the case of no conflict, embodiments in the present application and characteristics in embodiments can be mutually combined. The present application is described below in detail with reference to the drawings and in combination with embodiments.

The present disclosure provides a method for intelligently identifying a carbon storage box based on a GAN network. The method extracts abnormal values according to the disturbance effect of a fault zone on seismic waveforms, and performs fine identification of reservoir beds inside the fault zone for a fault-controlled karst reservoir bed, thus providing analysis of geological conditions for $CO_2$ storage in the fault zone area.

The method for intelligently identifying the carbon storage box based on the GAN network provided by the present disclosure comprises:

obtaining pre-stack single-shot seismic data and well logging data, then obtaining a near-well geological interpretation result, performing pre-stack time migration and superposition on the pre-stack single-shot seismic data to obtain post-stack seismic data;

building an isochronous stratigraphic framework model of a target horizon based on the post-stack seismic data;

performing well-to-seismic calibration on the post-stack seismic data and the well logging data to obtain a time-depth conversion relationship;

calculating a three-dimensional variance attribute volume based on the post-stack seismic data, delineating seismic waveform data of a stable sedimentary area, and removing seismic waveform data points in a fault zone area to obtain stable sedimentary background waveform data;

based on stable sedimentary background waveform data, through a generator of a background waveform data filling model based on the GAN neural network, obtaining fine stable sedimentary background seismic waveform data, and then obtaining a fine stable sedimentary background seismic waveform data invertomer, wherein the background waveform data filling model based on the GAN neural network is built by a generator and discriminator;

based on the well logging data, the post-stack seismic data and the time-depth conversion relationship, obtaining a three-dimensional wave impedance prediction data volume through a wave impedance value prediction model based on a cross-well seismic waveform structure;

calculating the difference between the fine stable sedimentary background seismic waveform data invertomer and the three-dimensional wave impedance prediction data volume to obtain an abnormal wave impedance data volume;

by removing areas lower than the average value in the three-dimensional variance attribute volume, retaining the abnormal wave impedance data in the spatial geometric contour of the fault zone to obtain a carbon storage box wave impedance data volume including the geometric structure and internal wave impedance characteristics of the carbon storage box;

comparing the near-well geological interpretation result with the carbon storage box wave impedance data volume, delineating a characteristic value interval of a hole reservoir bed, a characteristic value interval of a transition zone, and a characteristic value interval of surrounding rock, and obtaining a carbon storage box interpretation model; and based on the carbon storage box interpretation model, obtaining the dredging situation of the carbon storage box, and then obtaining the carbon storage box evaluation.

Figure 1B:
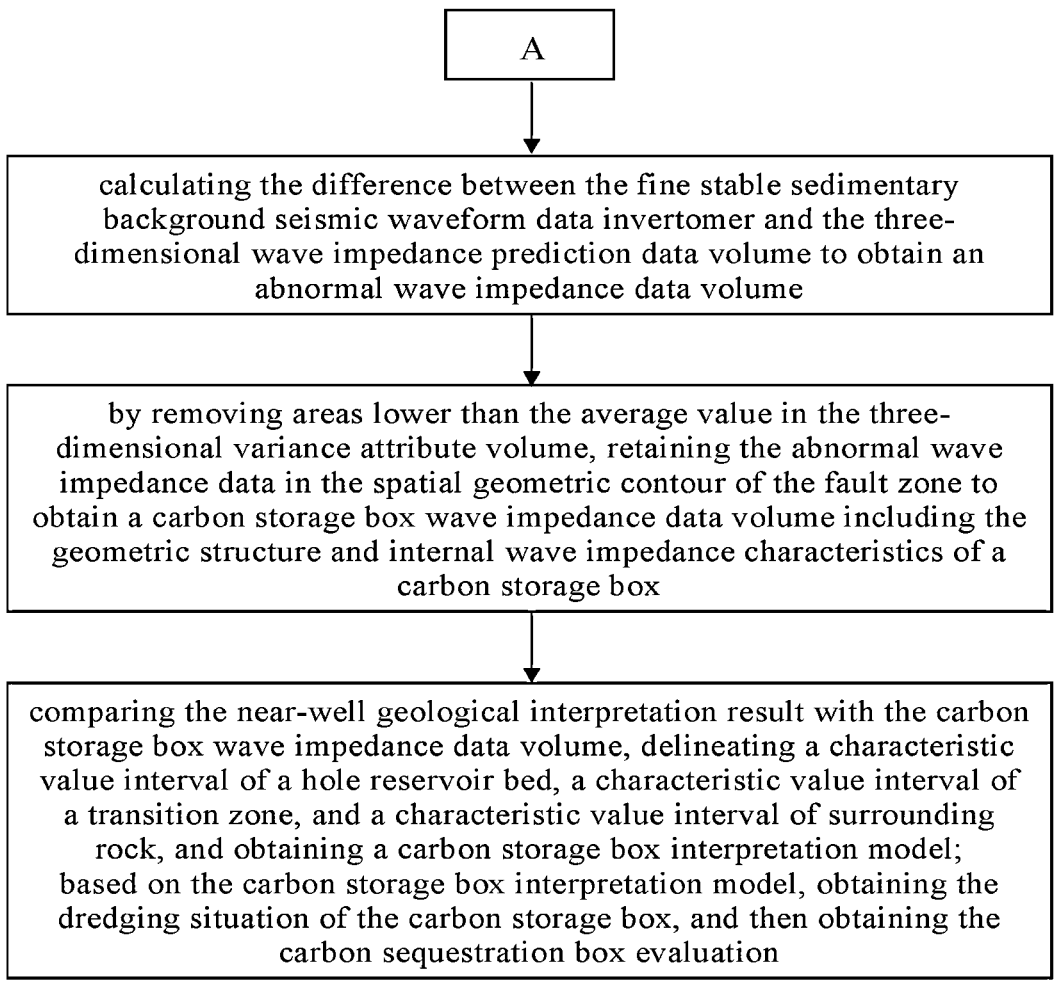

In order to more clearly explain the method for intelligently identifying the carbon storage site based on the GAN network, the steps in the embodiment of the present disclosure will be described in detail below with reference to FIG. 1.

Figure 2:
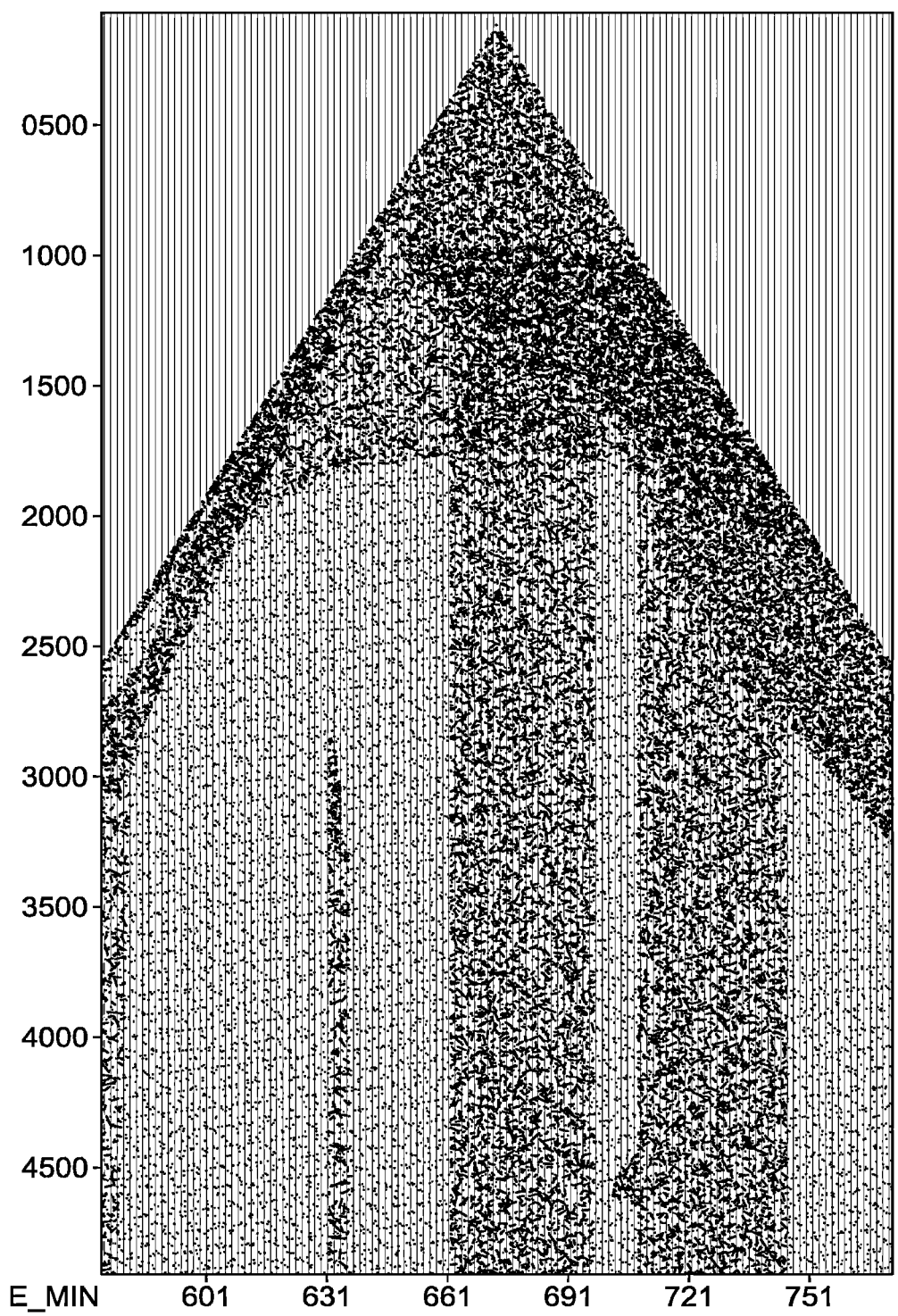
FIG. 2 is an effect schematic diagram of pre-stack single-shot seismic data according to an embodiment of the present disclosure.

Each step of the method for intelligently identifying the carbon storage site based on the GAN network in the first embodiment of the present disclosure is described in detail as follows:

obtaining pre-stack single-shot seismic data and well logging data, then obtaining the near-well geological interpretation result, performing pre-stack time migration and superposition on the pre-stack single-shot seismic data to obtain post-stack seismic data; and based on the post-stack the seismic data, tracing peak points of a reflection event, building a continuous surface of the reflection event. As the upper end of the carbon storage box is generally located in the inner area of carbonate rock and forms a strong reflection event with an overlying sandstone body, based on this geological background, the reflection event where a marker layer is located is determined to build the isochronous three-dimensional distribution of the marker layer. The pre-stack single-shot seismic data in the present embodiment is as shown in FIG. 2.

The pre-stack single-shot seismic data is seismic signals of seismic waves which are excited by a seismic wave excitation system and received by using a series of geophones. It reflects the information that the amplitude value of the seismic signal received by each geophone changes with the propagation time of the seismic wave. In the actual acquisition process, instruments and environments cannot reach the ideal state, resulting in white Gaussian noise in the high-frequency band of data. Therefore, the pre-stack single-shot seismic data need to be preprocessed.

Figure 3:
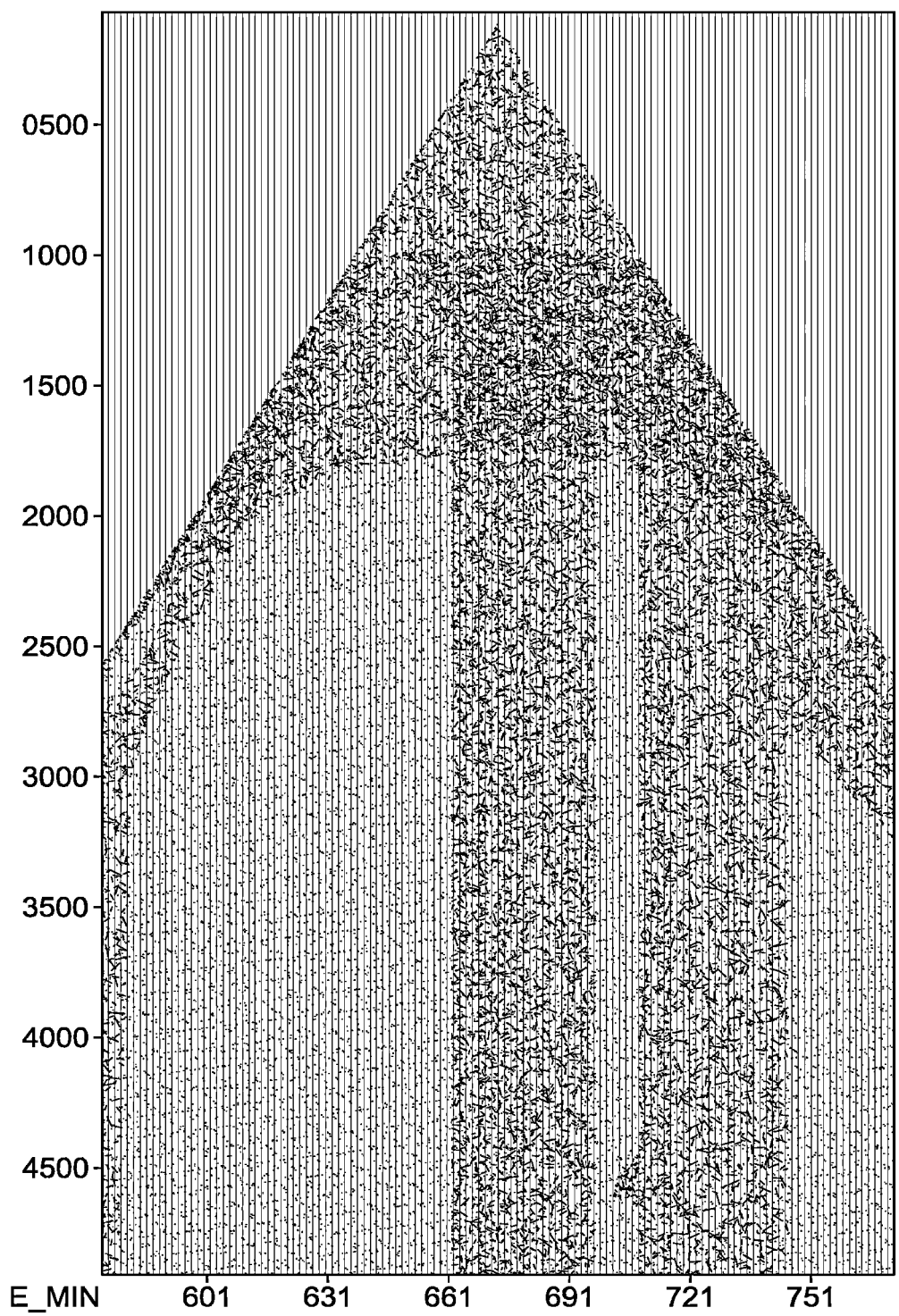
FIG. 3 is an effect schematic diagram of denoised seismic data according to an embodiment of the present disclosure.
Figure 4:
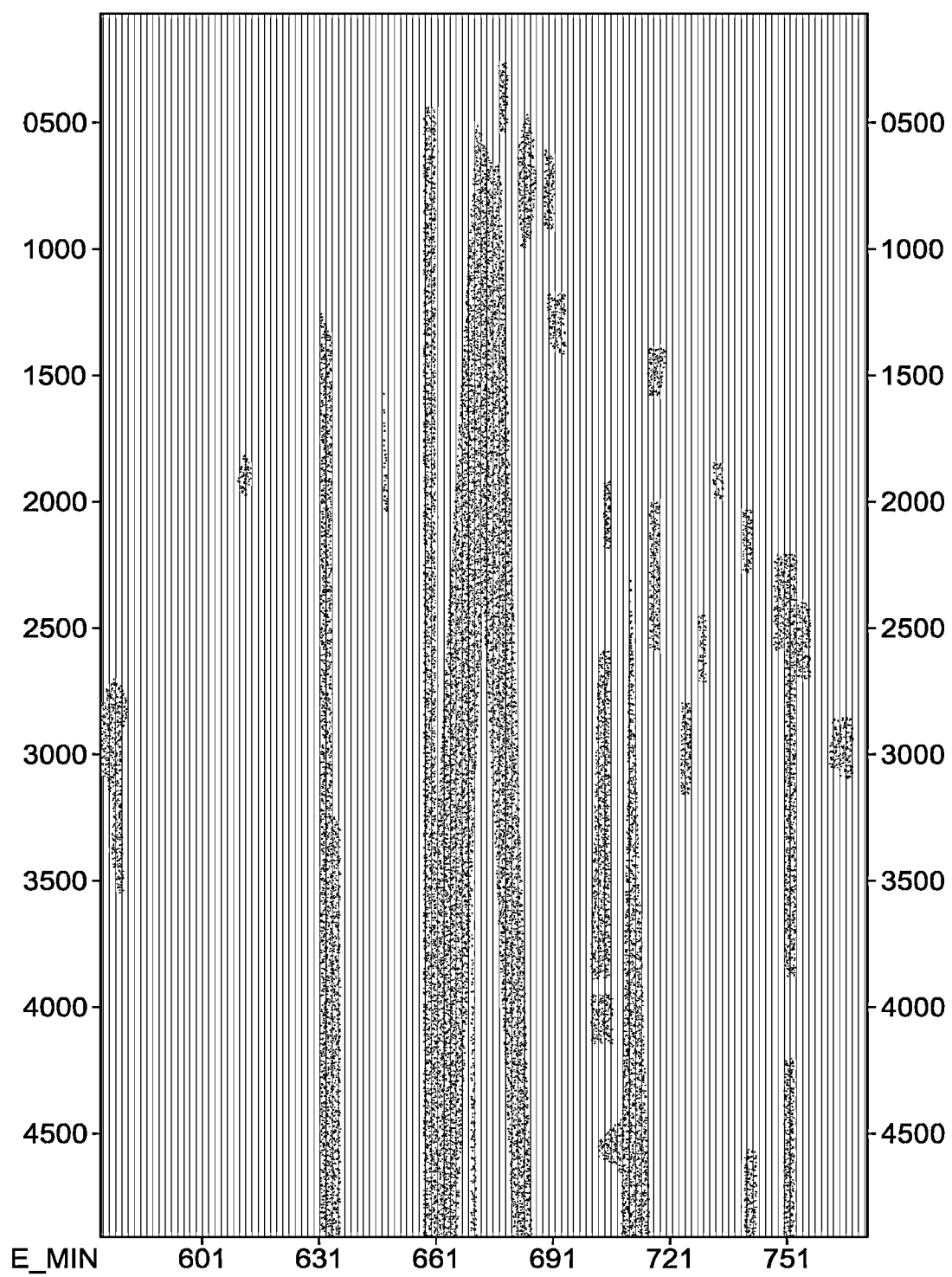
FIG. 4 is an effect schematic diagram of noise removed according to an embodiment of the present disclosure.

According to the present embodiment, a method of obtaining post-stack seismic data comprises:

based on the single-shot seismic data, performing denoising to obtain denoised seismic data, which is specifically as follows:

encoding the single-shot seismic data by a convolution antoencoder, and extracting hidden characteristics;

the convolution antoencoder can realize the noise reduction of the seismic data with no stratigraphic information and is divided into two parts: encoding the seismic data and decoding the encoded hidden characteristics, recovering original data, and filtering out white noise. The noise-reducing seismic data in the present embodiment is as shown in FIG. 3, and the removed noise is as shown in FIG. 4.

the convolution antoencoder is:

$$h''_k = f(W_{k1} * x + b_{k1})$$

where, x represents the single-shot seismic data, a convolution layer extracts hidden characteristics of the single-shot seismic data through multiple convolution kernels, $W_{k1}$ represents a weight matrix of a k1-th convolution kernel, $b_{k1}$ represents the offset of the k1-th convolution kernel, *represents convolution operation, $f$ represents a pooling function of the encoder, and $h''_{k1}$ represents the hidden characteristics extracted by the k1-th convolution kernel;

decoding and rebuilding the hidden characteristics by the decoder:

$$\hat{x} = \Sigma_H(W'_{k2} * g(h''_{k2}) + b'_{k2})$$

where, g represents a sampling function on the decoder, $W'_{k2}$ represents a weight matrix of a k2-th convolution kernel in the decoder, $b'_{k2}$ represents the offset of the k2-th convolution layer, the decoder decodes and rebuilds the hidden characteristics, and merges rebuilt results into denoised seismic data, and $\hat{x}$ represents characteristics after encoding and rebuilding; and performing pre-stack time migration and superposition on the denoised seismic data to obtain the post-stack seismic data. A conventional seismic data acquisition geophone corresponds to a piece of seismic waveform data with known latitude and longitude.

According to the present embodiment, a training method of the convolution antoencoder comprises:

inputting the single-shot seismic data with standard labels into the convolutional autoencoder to obtain the hidden characteristics, calculating the loss function by adopting L1 norm, at this time, the optimized objective function is:

$$(W^i_k, b^i_k) = \operatorname{argmin}|\hat{x} - x| = \operatorname{argmin}|g(f(x)) - x|$$

where, $W^i_k$, $b^i_k$ represents a weight matrix and offset of an i-th convolutional layer respectively;

the training process of the convolution autoencoder is the optimization process under the L1 norm, that is, solving the smallest absolute error $W^i_k$ and $b^i_k$ between x and the $\hat{x}$;

calculating network parameters by adopting an Adam optimization algorithm:

$$g_t = \nabla_\theta f_t(\theta_t - 1)$$

$$m_t = \beta_1 m_{t-1} + (1 - \beta_1) \cdot g_t$$

$$v_t = \beta_2 v_{t-1} + (1 + \beta_2) \cdot g_t^2$$

$$\hat{m}_t = \frac{m_t}{1 - \beta_1^t}$$

$$\hat{v}_t = \frac{v_t}{1 - \beta_2^t}$$

$$\theta_t = \theta_{t-1} - \alpha \cdot \frac{\hat{m}_t}{\sqrt{\hat{v}_t} + \varepsilon}$$

T is the current time step, $f_t$ is the optimization objective function, $g_t$ is the gradient of the objective function, θ is a model parameter, which includes $W^i_k$ and $b^i_k$, α is the iteration step size, $m_t$ is the first-order moment estimation of the gradient, $\beta_1$ is the exponential decay rate of $m_t$, $v_t$ is the second-order moment estimation of the gradient, $\beta_2$ the exponential decay rate of $v_t$, and $\beta'_1$, $\beta'_2 \in [0,1]$, $\varepsilon=10^{-8}$ are used to ensure the stability of iteration.

When the prediction error expressed by the loss function is less than 5%, the data at this time is output as denoised pre-stack seismic data.

Building the isochronous stratigraphic framework model of the target horizon based on the post-stack seismic data;

as the well logging data shows the changes of underground lithology, physical properties, and electrical information with depth, and the seismic waveform reflects the change characteristics of seismic wave signals received after seismic waves are reflected by strata with propagation time, therefore, a well-to-seismic calibration technology is needed to make a well logging curve in a depth domain correspond to the seismic waveform data in a time domain one by one.

performing well-to-seismic calibration on the post-stack seismic data and the well logging data to obtain the time-depth conversion relationship;

According to the present embodiment, a method of obtaining the time-depth conversion relationship comprises:

based on the post-stack seismic data, tracing peak points of the reflection event, constructing the continuous surface of the reflection event, and then determining the reflection event where the marker layer is located to build the isochronous three-dimensional distribution of the marker layer;

performing product operation based on a sonic time difference curve and a density curve in the well logging data of each known well site to obtain a wave impedance curve, and further calculating a reflection coefficient curve;

building a Ricker wavelet on the basis of the main seismic frequency of a target interval, and performing convolution calculation of the Ricker wavelet and the reflection coefficient curve to obtain a synthetic seismic record;

making the depth data of the maker layer at a wellbore of each drilling well site correspond to a three-dimensional distribution model of the maker layer, calculating the correlation between the synthetic seismic record and the post-stack seismic data of a seismic trace near the well, and when the waveform correlation is higher than the first correlation threshold, the first correlation threshold is set to be greater than 85%, and the well-to-seismic calibration is completed to finally obtain the time-depth conversion relationship between the well logging depth and the two-way travel time of seismic reflection waves;

$$T_d = T_{H_0} + 2\sum_{i=1}^{n} T_i \cdot \Delta H$$

where, $T_{H_o}$ represents the two-way travel time of the seismic data corresponding to the depth of a sonic well logging marker layer; $T_i$ represents sonic time difference; $\Delta H$ represents a well logging curve data sampling interval; and $T_d$ represents the two-way travel time of a seismic wave;

In order to obtain the change characteristics of stable sedimentary background wave impedance, the influence of the fault zone on seismic waveform information needs to be removed. Therefore, it is necessary to determine the specific location and spatial geometric structure of the fault zone to remove them.

calculating a three-dimensional variance attribute volume based on the post-stack seismic data, delineating seismic waveform data of a stable sedimentary area, and removing seismic waveform data points in the fault zone area to obtain stable sedimentary background waveform data;

According to the present embodiment, a method of obtaining the seismic waveform data of the stable sedimentary area comprises:

based on the post-stack seismic data, calculating the seismic waveform variance attribute data volume:

letting the data of each sampling point in the post-stack seismic data be $S_{ijk}$, p represents a seismic gird wire size, q represents a seismic grid trace number, and k represents a sampling point serial number of a seismic record sampled at 1 ms;

calculating a mean square error of sampling point data in a preset sampling area, and the present embodiment takes the 3×3×3 area as an example:

$$Q_{pqk} = \sum_{p-1}^{p+1}\sum_{q-1}^{q+1}\sum_{k-1}^{k+1}\left(S_{pqk} - 1/9\sum_{p-1}^{p+1}\sum_{q-1}^{q+1}\sum_{k-1}^{k+1}S_{pqk}\right)^2$$

translating the sampling areas vertically and horizontally, transversely calculating the data mean square errors of all the sampling areas to obtain a three-dimensional variance attribute volume;

slicing the three-dimensional variance attribute volume, obtaining the distribution characteristics of variance attribute data on a plane, and taking the area where the variance attribute value is lower than the total energy average value as the sedimentary stable area, wherein data corresponding to the sedimentary stable area is the stable sedimentary background seismic waveform data. In this step, based on the post-stack seismic waveform data, after the seismic amplitude data points of the fault zone area are eliminated, the seismic waveform data of the stable sedimentary area which is not affected by the fault zone is left.

based on the stable sedimentary background waveform data, through a generator of a background waveform data filling model based on the GAN neural network, obtaining fine stable sedimentary background seismic waveform data, and then obtaining a fine stable sedimentary background seismic waveform data invertomer, wherein the background waveform data filling model based on the GAN neural network is built by a generator and discriminator;

In a specific application scenario, the waveform data of the stable sedimentary area is incomplete, and the data of the fault zone area is missing. In the present embodiment, the missing data can be filled in according to the waveform law by using the GAN neural network to synthesize the seismic waveforms for assisting the building of the carbon storage box interpretation model.

Figure 5A:
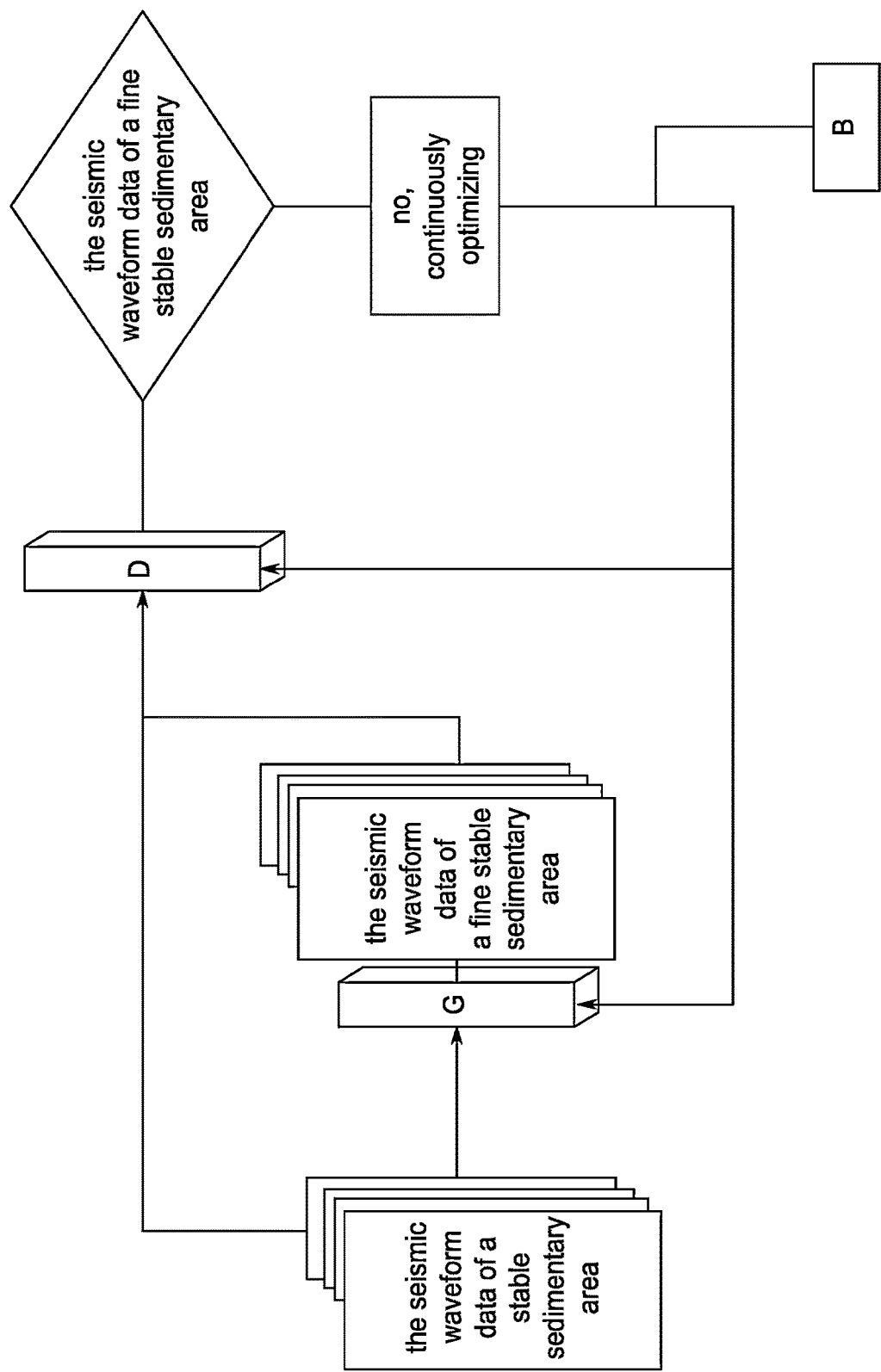
FIG. 5A and FIG. 5B is a flow schematic diagram of filling through the GAN network according to an embodiment of the present disclosure.
Figure 5B:
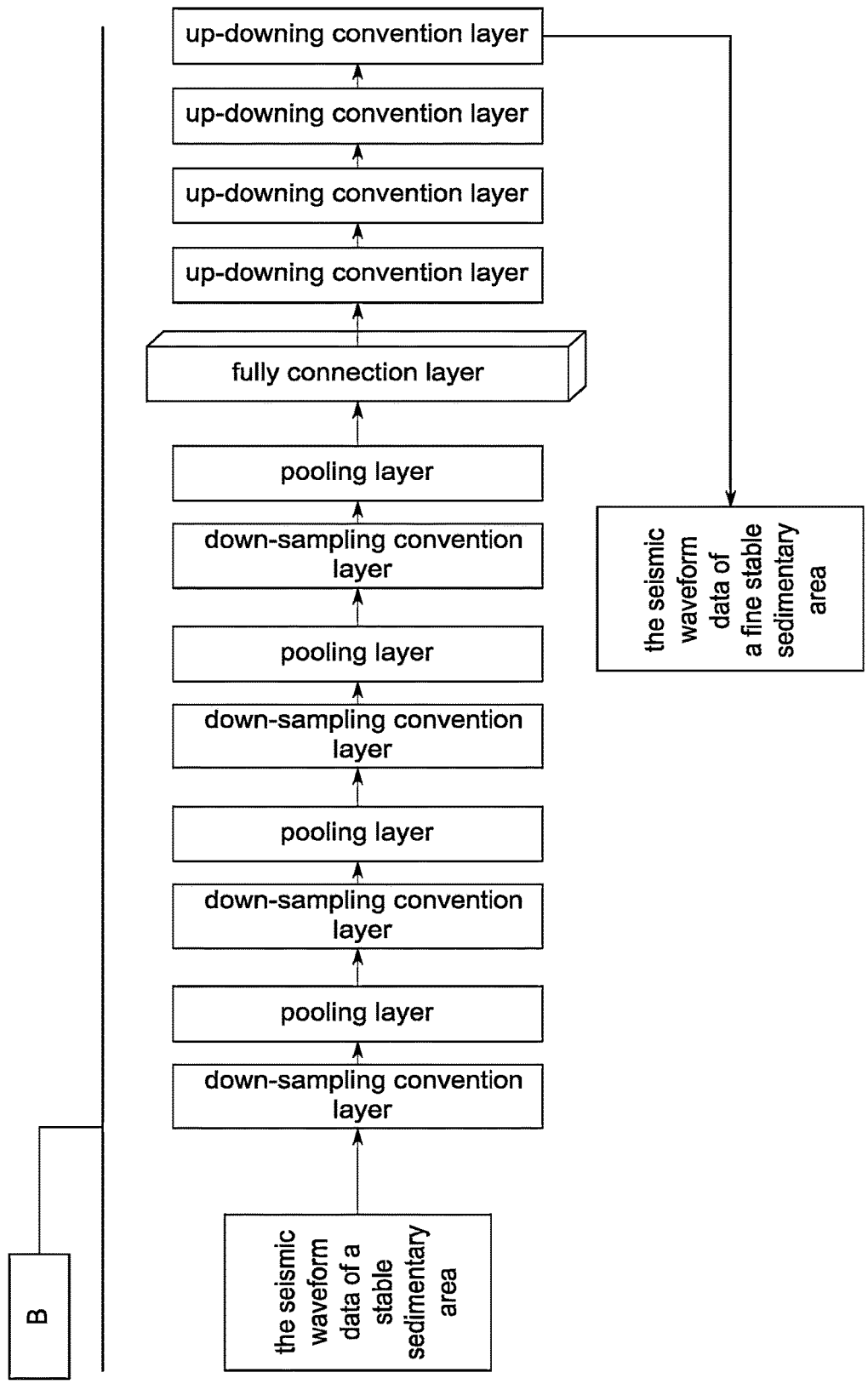

According to the present embodiment, the background waveform data filling model based on the GAN neural network is as shown in FIG. 5, comprising the generator and the discriminator;

wherein the generator comprises four groups of down-sampling convolution layers and pooling layers, a full connection layer and four up-sampling convolution layers, and four kinds of convolution kernels with the scale of 5×5 are used in each down-sampling convolution layer; and the discriminator comprises four up-sampling convolution layers.

Figure 6:
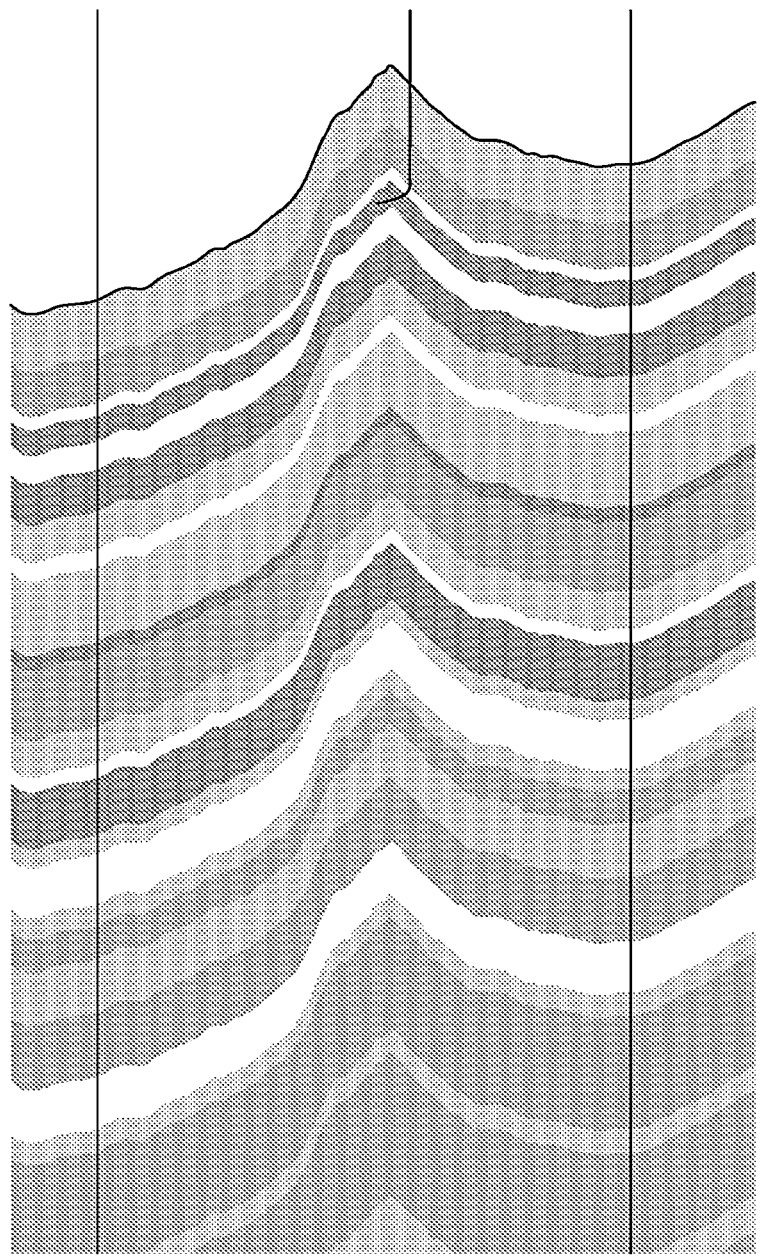
FIG. 6 is an effect schematic diagram of seismic waveform data of a stable sedimentary area according to an embodiment of the present disclosure.

According to the present embodiment, a training method of the background wave impedance data filling model based on the GAN neural network comprises:

based on the stable sedimentary background waveform data, generating stable sedimentary background characteristics by the generator;

extracting stable sedimentary background waveform data by the encoder in the generator, specifically, calculating abstract characteristic representation by the four groups of down-sampling convolution layers and pooling layers, wherein each convolution layer adopts 4 convolution kernels with a median scale of 5×5, and gradually reducing the image resolution in the down-sampling process through the pooling layers to obtain abstract characteristic representation; and the purpose of the down-sampling convolution layer is to increase the output receiving field;

classifying, integrating, and normalizing the abstract characteristic representation with the resolution and number of characteristic graphs retained through the full connection layer to obtain a normalized characteristic image; when the encoder obtains m characteristic graphs with the size of n×n, the input and output of the full connection layer are m characteristic graphs with the size of n×n;

collecting missing data of the normalized characteristic image by the decoder, specifically, performing weighted up-sampling by the four up-sampling convolution layers to obtain stable sedimentary background characteristics with the same scale as the stable sedimentary background waveform data, namely fine stable sedimentary background seismic waveform data; the up-sampling convolution layer adopts filters with a learning function, each filter adopts a ReLU activation function, the up-sampling convolution layer performs nonlinear weighted up-sampling on the characteristics generated by the encoder until the original data size is reached;

and the discriminator comprises four down-sampling convolution layers, and are used for judging and distinguishing whether a sample from the generator is a real sample. Usually, in the process of network training, the loss function in the discriminator contains antagonistic loss. The difference between the generated image and the real image in the hidden layer characteristics is continuously mined through training, which makes the generated image closer to the real image in characteristics. The upper part in FIG. 5 is the process of the background wave impedance data filling model based on the GAN neural network in the training process, and the lower part is the process of generating the stable sedimentary background seismic waveform data by the generator; and the effect of the generated fine and stable sedimentary background seismic waveform data is as shown in FIG. 6.

Setting an objective function of the model as:

$$\min_{G}\max_{D} V(D, G) = E_{x\sim P_{data(x)}}[\log D(x)] + E_{v\sim P_v(v)}[\log(1 - D(G(v)))]$$

where, x represents waveform amplitude in the data $P_{data(x)}$ to be identified, v represents a random noise vector, $P_v(v)$ represents the probability distribution of a random noise vector, and is set as Gaussian distribution here, E represents an expected value, log represents taking the logarithm, min represents taking the minimum, max represents taking the maximum, D represents the discriminator, and G represents the generator;

setting an objective function $Obj^D(\theta_D, \theta_G)$ of the discriminator as:

$$Obj^D(\theta_D, \theta_G) = -E_{x\sim P_{data(x)}}[\log D(x)] - E_{z\sim P_z(z)}[\log(1-D(G(v)))]$$

setting an objective function of the generator as:

$$Obj^G = \log(1-D(G(v)))$$

alternately iterating the maximization of the objective function of the discriminator and the minimization of the objective function of the generator until the classification accuracy of the discriminator for the seismic waveform data of the fine stable sedimentary area output by the generator and the seismic waveform data of the stable sedimentary area not processed by the generator is lower than a preset threshold, in the present embodiment, stopping the iteration when the classification accuracy of the discriminator for data output by the generator and original data drops to 45%-55%, and obtaining the trained background wave impedance data filling model based on the GAN neural network.

According to the present disclosure, a method of obtaining the stable sedimentary background seismic waveform data invertomer comprises:

letting an unknown underground wave impedance model parameter m be g-dimensional space vector m={$m_1, \ldots, m_g$} based on the stable sedimentary background seismic waveform data;

obtaining the observation data d as a r-dimensional data vector d={$d_1, \ldots, d_r$} through an earthquake acquisition process;

through a nonlinear function kernel G, establishing an unknown underground model parameter, and establishing the relationship between the parameter and the r-dimensional data vector to obtain a forward model:

$$d = G(m) + n$$

where, n={$n_1, \ldots, n_r$} represents random noise independent of the underground wave impedance model parameter m, which obeys Gaussian distribution;

building an inversion objective function based on the forward model:

$$\min F[d, G(m)] = \min \|d, G(m)\|_2^2$$

where, F is a mean square error between the observation data d and the prediction data G(m);

performing linearized solution on the inversion objective function;

performing Taylor expansion on the forward model and omitting higher-order terms of more than quadratic to obtain a brief expression of prediction data:

$$\Delta G(m) = G(m) - G(m^0) = A\Delta m = A(m - m^0)$$

where, $m^0$ represents the initial model established according to prior information, A is a Jacobian matrix, and the element of A is first-order partial differential $\partial G_i/\partial m_j$;

letting $d_0 = G(m_0) + \xi$, $\Delta d = d - d_0$, then the iterative equation of the forward model is:

$$m^{t+1} = m^t + \Delta m$$

where, $m^k$ represents the forward model after iteration t times, $m^{k+1}$ represents the forward model after iteration k+1 times, and $d_0$ is the noise-adding prediction data;

assuming that the inversion depth domain model parameters have prior probability distribution P(M=m), according to Bayesian formula, the probability distribution is as follows:

$$P(M = m \mid D = d) = \frac{P(D = d \mid M = m)P(M = m)}{P(D = d)},$$

the probability distribution of adding random noise is as follows:

$$P(D = d \mid M = m) =$$

$$P(n) = \frac{1}{(2\pi)^{\frac{n}{2}}|\det C_n|^{\frac{1}{2}}} \exp\{-[d - G(m)]^T C_n^{-1}[d - G(m)]\},$$

where, $C_n$ is a noise covariance matrix, $C^{-1}_n$ is the inversion operation of the noise covariance matrix, and det is the determinant of the corresponding matrix;

n is noise and obeys Gaussian distribution, the average value is 0, $C_n$ is an equivalent diagonal matrix, and diagonal elements are the variance $\tau^2_n$ containing noise of data center, then the probability distribution of adding the random noise is deformed as follows:

$$P(D = d \mid M = m) = \prod \frac{1}{(2\pi)^{\frac{n}{2}}\sigma_n} \exp\{-\sigma_n^2 \sum [d - G(m)]^2\}$$

for the prior probability distribution P(M=m) of the inversion depth domain model parameter, setting the initial model $m^0$, there is $m = m^0 + \Delta m$, and the probability distribution of the equivalent depth domain model is $m = m^0 + \Delta m$;

letting the probability distribution of the equivalent depth domain model obey Gaussian distribution, and the probability distribution of the depth domain model with the random noise added is:

$$P(M - m) = \frac{1}{(2\pi)^{\frac{n}{2}}|\det C_{\Delta m}|^{\frac{1}{2}}} \exp\{-[m - m^0]^T C_{\Delta m}^{-1}[m - m^0]\}$$

assuming that the average value of the depth domain model parameters is equal to an initial model m⁰, they do not affect each other, and there is a simplified probability distribution of the depth domain model, which is as follows:

$$P(M-m) = \frac{1}{(2\pi)^{\frac{n}{2}}\sigma_m}\exp\{-\sigma_m^2[m-m^0]\},$$

where, $\sigma_m$ represents the variance value of the real model relative to a given initial model;

a denominator P(D=d) in the probability distribution deformation with the random noise added depends on data acquisition and processing, and is set as a constant, and maximizing posterior probability is equivalent to maximizing a numerator, which maximizes posterior probability distribution:

$$P(M=m|D=d) =$$
$$\prod \frac{1}{(2\pi)^n \sigma_n \sigma_m} \exp\{-\sigma_n^{-2}\sum[d-G(m)]^2 - \sigma_m^2 \sum[m-m^0]^2\},$$

making the maximum equivalent formula of posterior probability distribution as:

$$F(m) = \sigma_n^{-2}\Sigma[d-G(m)]^2 + \sigma_m^2\Sigma[m-m^0]^2 \to 0,$$

letting the partial derivative of the model parameter m equal to zero, and G(m)=G(m⁰)+AΔm, G(m)=G(m⁰)+AΔm, thereby obtaining the matrix equation:

$$\frac{\partial F(m)}{\partial m} = \sigma_n^{-2}[d-G(m^0) - A\Delta m]IA - \sigma_m^2 I\Delta m = 0$$

$$dI\sigma_n^{-2}A - \sigma_m^2 I\Delta m - G(m^0)\sigma_n^{-2}IA - A\Delta mI\sigma_n^{-2}A = 0$$

where $$A_{ij} = \frac{\partial G_i}{\partial m_j},$$

I is an identity matrix, Δm is a wave impedance iterative matrix, arranging to obtain the basic formula of random inversion as follows:

$$[d-G[m^0]]A = [AA^T + \sigma_n^2\sigma_m^{-2}I]\Delta m \qquad \Delta m = [AA^T + \sigma_n^2\sigma_m^{-2}I]^{-1}A^T[d-G(m^0)],$$

the iterative formula of the basic formula of random inversion is: $m^{k+1} = m^k + \Delta m$;

wherein, G[m⁰] is a depth domain synthetic seismic record formed by a parametric model, and d is observation data;

updating the parameters of the unknown underground wave impedance model through continuous iteration until positive and negative shocks occur in Δm, where, m is low-frequency wave impedance inversion data;

based on the correlation between the plane coordinates of the virtual well site and the plane coordinates of the seismic data, further determining the one-to-one correspondence between the virtual well and the low-frequency wave impedance inversion data, and then assigning the low-frequency wave impedance inversion data beside the virtual well to the virtual well to obtain the wave impedance data of the virtual well site;

based on the wave impedance inversion data volume, extracting the wave impedance data of the virtual well site, setting the calculation area as the whole range of the work area in the geological framework according to the interpolation calculation of all virtual well wave impedance data in the time window range defined by the stratigraphic framework to obtain the stable stratigraphic wave impedance data.

Figure 7:
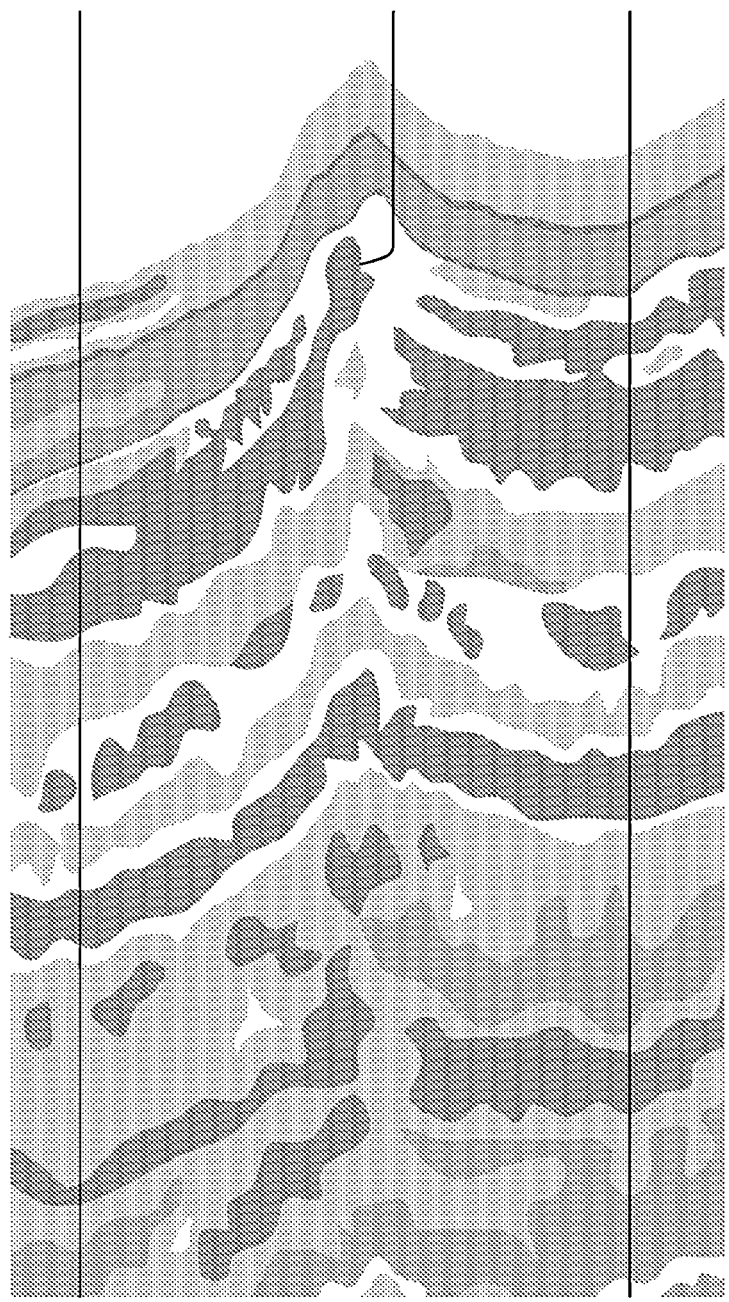
FIG. 7 is an effect schematic diagram of a three-dimensional wave impedance prediction data volume according to an embodiment of the present disclosure.

Based on the well logging data, post-stack seismic data, and the time-depth conversion relationship, obtaining a three-dimensional wave impedance prediction data volume through a wave impedance value prediction model based on a cross-well seismic waveform structure; and the three-dimensional wave impedance prediction data volume is as shown in FIG. 7.

According to the present embodiment, a method of obtaining the three-dimensional wave impedance prediction data volume comprises:

based on the acoustic time difference curve in well logging data, obtaining the propagation velocity of seismic waves by unit conversion;

determining the main frequency of an earthquake according to the frequency spectrum peak of the seismic waveform data of the target horizon in the post-stack seismic data;

calculating the wavelength of the seismic wave:

$$L = v/f_{main}$$

where, L represents the wavelength of the seismic wave, v represents the velocity of the seismic wave in the target interval, and $f_{main}$ represents the main frequency of the seismic wave;

according to the coordinates of the well site and the plane coordinates of the seismic data, matching the well logging acoustic time difference curve with the near-well seismic waveform corresponding to the density period;

taking the half-wavelength $$\frac{L}{2}$$

of the seismic wave as the length of a sliding time window and the step length as 1, extracting all seismic waveform amplitude data points in the sliding time window as seismic waveform amplitude samples;

extracting multiple samples in the same well to obtain a seismic waveform amplitude sample set;

inputting the seismic waveform amplitude sample set into a wave impedance value prediction model based on a cross-well seismic waveform structure to obtain a three-dimensional wave impedance prediction data volume;

wherein, the wave impedance value prediction model based on the cross-well seismic waveform structure comprises an input layer, a hidden layer, and an output layer;

the number of neurons in the input layer is the same as the number of data points in the seismic waveform amplitude sample set;

the hidden layer is built based on a fully connected structure:

the input of the p-th neuron in the Layer-th layer is equal to the neuron in the Layer-1-th multiplied by the weight plus an offset vector:

$$Z^{Layer}_p = \Sigma_q \text{weight}^{Layer}_{pq} a^{Layer-1}_q + b^{Layer}_q,$$

the output of the p-th neuron in the Layer-th layer is expressed as:

$$a^{Layer}_p = \sigma(\Sigma_q \text{weight}^{Layer}_{pq} a^{Layer-1}_q + b^l_p),$$

a represents an activation function, $a_k^{Layer-1}$ represents the output of the q-th neuron in the Layer-1-th layer, and $weight_{pq}^{Layer}$ represents the connection weight between the p-th neuron in the Layer-th layer and the q-th neuron in the previous layer;

$$\sigma(\varepsilon) = \begin{cases} \varepsilon, & \varepsilon \geq 0 \\ p\varepsilon, & \varepsilon < 0 \end{cases}$$

p represents a neural network hyperparameter the number of the neurons in the output layer is the same as that in the input layer, and the output layer outputs wave impedance values corresponding to the seismic waveforms, which are merged into the three-dimensional wave impedance prediction data volume. The effect of the three-dimensional wave impedance prediction data volume is as shown in FIG. 7.

According to the present embodiment, a training method of the wave impedance value prediction model based on the cross-well seismic waveform structure comprises:

obtaining a training data set and performing forward propagation:

$$z^l = w^l a^{l-1} + b^l a^l = \sigma(z^l),$$

where, the cost function is:

$$C = \frac{1}{2}\sum_j (y_j - a_z^l)^2,$$

$y_j$ represents a true value;

the error in the forward calculation of each layer of neural network is:

$$\delta_j^l = \frac{\partial C}{\partial z_j^l} = \sum_k \frac{\partial C}{\partial z_k^{l+1}} \frac{\partial z_k^{l+1}}{\partial a_j^l} \frac{\partial a_j^l}{\partial z_j^l} = \sum_k \delta_k^{l+1} \frac{\partial (w_{kj}^{l+1} a_j^l + b_k^{l+1})}{\partial a_j^l} \cdot \sigma'(z_j^l) =$$

$$\sum_k \delta_k^{l+1} \cdot w_{kj}^{l+1} \cdot \sigma'(z_j^l) = ((w^{l+1})\delta^{l+1}) \odot \sigma'(z^l),$$

the gradient of weight, that is, the partial derivative of the objective function to the weight, is:

$$\frac{\partial C}{\partial w_{jk}^l} = \frac{\partial C}{\partial z_j^l} \cdot \frac{\partial z_j^l}{\partial w_{jk}^l} = \delta_j^l \cdot \frac{\partial (w_{jk}^l a_k^{l-1} + b_j^l)}{\partial w_{jk}^l} = a_k^{l-1} \delta_j^l$$

the gradient of the offset, that is, the derivative of the offset by the objective function is:

$$\frac{\partial C}{\partial b_j^l} = \frac{\partial C}{\partial z_j^l} \cdot \frac{\partial z_j^l}{\partial b_j^l} = \delta_j^l \cdot \frac{\partial (w_{jk}^l a_k^{l-1} + b_j^l)}{\partial b_j^l} = \delta_j^l,$$

the error in forward propagation is:

$$\delta^L = \nabla_a C \odot \sigma'(Z^L),$$

the error in back propagation is:

$$\delta^l = ((w^{l+1})^T \delta^{l+1}) \odot \sigma'(z^l),$$

updating parameters by a gradient descending method:

$$w^l \rightarrow w^l - \frac{\eta}{m}\sum_x \delta^{x,l}(a^{x,l-1})^T$$

$$b^l \rightarrow b^l - \frac{\eta}{m}\sum_x \delta^{x,l},$$

repeatedly iterating until the error is lower than the preset error threshold or preset iteration times are reached, and obtaining the trained wave impedance value prediction model based on the cross-well seismic waveform structure.

Figure 8:
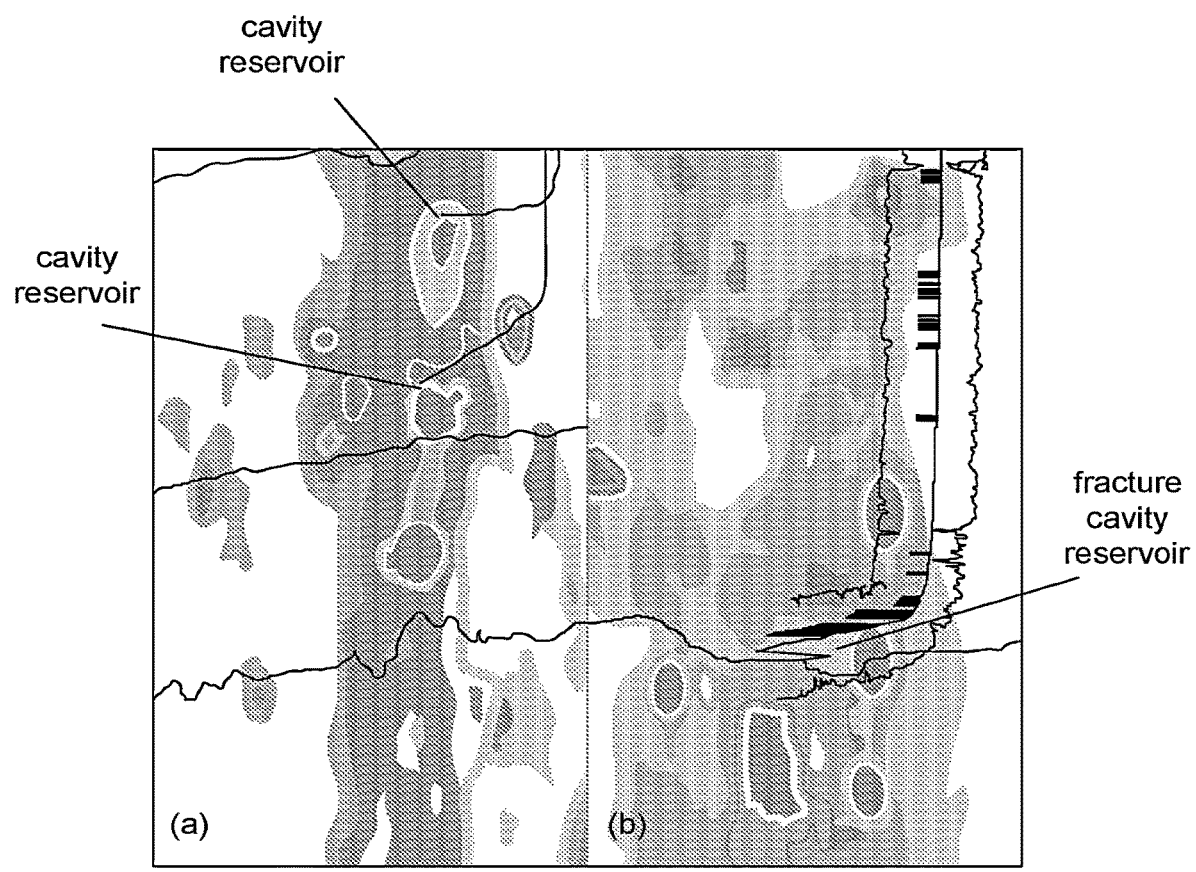
FIG. 8 is an effect schematic diagram of an abnormal wave impedance data volume according to an embodiment of the present disclosure.

Intercepting cross-well seismic waveform data by adopting the sliding time window, which is used as the input of a neural network model, calculating the wave impedance values corresponding to each seismic waveform, and merging the wave impedance values corresponding to the seismic waveforms into the three-dimensional wave impedance prediction data volume. Due to the overlap between data points, calculating the average value of overlapping areas of the calculated wave impedance data, which is taken as the wave impedance prediction value, and when each seismic amplitude data point corresponds to one wave impedance prediction value, the three-dimensional wave impedance prediction data volume is obtained.

calculating the difference between the stable sedimentary background seismic waveform data invertomer and the three-dimensional wave impedance prediction data volume to obtain the abnormal wave impedance data volume which is as shown in FIG. 8;

by removing areas lower than the average value in the three-dimensional variance attribute volume, retaining the abnormal wave impedance data in the spatial geometric contour of the fault zone to obtain a carbon storage box wave impedance data volume including the geometric structure and internal wave impedance characteristics of the carbon storage box; and comparing the near-well geological interpretation result with the carbon storage box wave impedance data volume, delineating a characteristic value interval of a hole reservoir bed, a characteristic value interval of a transition zone, and a characteristic value interval of surrounding rock, and obtaining a carbon storage box interpretation model. The well logging interpretation results are compared with the carbon storage box wave impedance data, an area with the wave impedance data greater than 0.82 is defined as a crack reservoir bed, an area with the wave impedance data between 0.63 and 0.82 is defined as the cave reservoir bed, an area with the wave impedance data between 0.31 and 0.63 is defined as a transition zone, and an area with the wave impedance data less than 0.31 is defined as the surrounding rock, which is used as the final carbon storage box reservoir bed interpretation model.

based on the carbon storage box interpretation model, the dredging situation of the carbon storage box is obtained, and then the carbon storage box evaluation is obtained; and the present embodiment focuses on the fracture distribution, analyzes the combination relationship between a fracture structure and a fault-karst cave, monitors the promoting effect of fracture on the dredging performance of carbon dioxide, or judges whether there is a fracture leading to carbon dioxide leakage, obtains the dredging situation of the carbon storage box, and then evaluates the current state of the carbon storage box.

Although the steps are described in the above-mentioned sequence in the above-mentioned embodiment, those skilled in the art can understand that in order to achieve the effect of the present embodiment, different steps do not need to be performed in such an order, but can be performed simultaneously (in parallel) or in reverse order, and these simple changes are within the scope of protection of the present disclosure.

A second embodiment of the present disclosure provides a system for identifying the carbon storage box based on the GAN network, which comprises:

a seismic data preprocessing module configured for obtaining pre-stack single-shot seismic data and well logging data, then obtaining a near-well geological interpretation result, performing pre-stack time migration and superposition on the pre-stack single-shot seismic data to obtain post-stack seismic data, and based on the pre-stack single-shot seismic data, obtaining the depth data of the marker layer of the target horizon and a three-dimensional distribution model of the marker layer;

an isochronous stratigraphic framework model obtaining module configured for building an isochronous stratigraphic framework model of a target horizon based on the post-stack seismic data;

a time-depth conversion relationship obtaining module configured for performing well-to-seismic calibration on the post-stack seismic data and the well logging data to obtain a time-depth conversion relationship;

a stable sedimentary area obtaining module configured for calculating a three-dimensional variance attribute volume based on the post-stack seismic data, delineating seismic waveform data of a stable sedimentary area, and removing seismic waveform data points in the fault zone area;

a stable sedimentary background seismic waveform data invertomer obtaining module configured for based on the seismic waveform data of the stable sedimentary area, through a background waveform data filling model based on the GAN neural network, obtaining stable sedimentary background seismic waveform data, and then obtaining a stable sedimentary background seismic waveform data invertomer, wherein the background waveform data filling model based on the GAN neural network is built by a generator and discriminator;

a three-dimensional wave impedance prediction data volume obtaining module configured for based on the well logging data, the post-stack seismic data and the time-depth conversion relationship, obtaining a three-dimensional wave impedance prediction data volume through a wave impedance value prediction model based on a cross-well seismic waveform structure an abnormal wave impedance data volume obtaining module configured for calculating the difference between the fine stable sedimentary background seismic waveform data invertomer and the three-dimensional wave impedance prediction data volume to obtain an abnormal wave impedance data volume;

a carbon storage box wave impedance data volume obtaining module configured for by removing areas lower than the average value in the three-dimensional variance attribute volume, retaining the abnormal wave impedance data in the of spatial geometric contour of the fault zone to obtain a carbon storage box wave impedance data volume including the geometric structure and internal wave impedance characteristics of a carbon storage box; and a model intepretation module configured for comparing the near-well geological interpretation result with the carbon storage box wave impedance data volume, delineating a characteristic value interval of a hole reservoir bed, a characteristic value interval of a transition zone, and a characteristic value interval of surrounding rock, and obtaining a carbon storage box interpretation model.

What is claimed is:

1. A method for intelligently identifying a carbon storage box based on a GAN network, comprising:

obtaining pre-stack single-shot seismic data and well logging data, then obtaining a near-well geological interpretation result, performing pre-stack time migration and superposition on the pre-stack single-shot seismic data to obtain post-stack seismic data;

building an isochronous stratigraphic framework model of a target horizon based on the post-stack seismic data;

performing well-to-seismic calibration on the post-stack seismic data and the well logging data to obtain a time-depth conversion relationship;

calculating a three-dimensional variance attribute volume based on the post-stack seismic data, delineating seismic waveform data of a stable sedimentary area, and removing seismic waveform data points in a fault zone area to obtain stable sedimentary background waveform data;

based on the stable sedimentary background waveform data, through a generator of a background waveform data filling model based on the GAN neural network, obtaining fine stable sedimentary background seismic waveform data, and then obtaining a fine stable sedimentary background seismic waveform data invertomer, wherein the background waveform data filling model based on the GAN neural network is built by a generator and discriminator;

based on the well logging data, the post-stack seismic data and the time-depth conversion relationship, obtaining a three-dimensional wave impedance prediction data volume through a wave impedance value prediction model based on a cross-well seismic waveform structure;

calculating the difference between the fine stable sedimentary background seismic waveform data invertomer and the three-dimensional wave impedance prediction data volume to obtain an abnormal wave impedance data volume;

by removing areas lower than the average value in the three-dimensional variance attribute volume, retaining the abnormal wave impedance data in the spatial geometric contour of the fault zone to obtain a carbon storage box wave impedance data volume including the geometric structure and internal wave impedance characteristics of a carbon storage box;

comparing the near-well geological interpretation result with the carbon storage box wave impedance data volume, delineating a characteristic value interval of a hole reservoir bed, a characteristic value interval of a transition zone, and a characteristic value interval of surrounding rock, and obtaining a carbon storage box interpretation model; and based on the carbon storage box interpretation model, obtaining the dredging situation of the carbon storage box, and then obtaining the carbon sequestration box evaluation.

2. A method for identifying a carbon storage box reservoir bed based on the GAN network of claim 1, wherein a method of obtaining the post-stack seismic data comprises:

based on the single-shot seismic data, performing denoising to obtain denoised seismic data, which specifically comprises:

encoding the single-shot seismic data by a convolution antoencoder, extracting hidden characteristics;
the convolution antoencoder is:

$$h''_k = f(W_{k1} * x + b_{k1})$$

where, x represents the single-shot seismic data, a convolution layer extracts hidden characteristics of the single-shot seismic data through multiple convolution kernels, $W_{k1}$ represents a weight matrix of a k1-th convolution kernel, $b_{k1}$ represents the offset of the k1-th convolution kernel, * represents convolution operation, $f$ represents a pooling function of the encoder, and $h''_{k1}$ represents the hidden characteristics extracted by the k1-th convolution kernel;

decoding and rebuilding the hidden characteristics by the decoder:

$$\hat{x} = \Sigma_H(W'_{k2} * g(h''_{k2}) + b'_{k2}),$$

where, g represents a sampling function on the decoder, $W'_{k2}$ represents a weight matrix of a k2-th convolution kernel in the decoder, $b'_{k2}$ represents the offset of the k2-th convolution layer, and the decoder decodes and rebuilds the hidden characteristics, and merges rebuilt results into denoised seismic data; and performing pre-stack time migration and superposition on the denoised seismic data to obtain the post-stack seismic data.

3. A method for intelligently identifying a carbon storage box based on a GAN network of claim 1, wherein a method of obtaining the time-depth conversion relationship comprises:

based on the post-stack seismic data, tracing peak points of a reflection event, constructing a continuous surface of the reflection event, and then determining the reflection event where the marker layer is located to build the isochronous three-dimensional distribution of the marker layer;

performing product operation based on a sonic time difference curve and a density curve in the well logging data of each known well site to obtain a wave impedance curve, and further calculating a reflection coefficient curve;

building a Ricker wavelet on the basis of the main seismic frequency of a target interval, and performing convolution calculation of the Ricker wavelet and the reflection coefficient curve to obtain a synthetic seismic record;

making the depth data of the maker layer at a wellbore of each drilling well position model correspond to a three-dimensional distribution model of the maker layer, calculating the correlation between the synthetic seismic record and the post-stack seismic data of a seismic trace near the well, and when the waveform correlation is higher than the first correlation threshold, the well-to-seismic calibration is completed to finally obtain the time-depth conversion relationship between the well logging depth and the two-way travel time of seismic reflection waves;

$$T_d = T_{H_o} + 2\Sigma^n_{i=1} T_i \Delta H,$$

where, $T_{H_o}$ represents the two-way travel time of the seismic data corresponding to the depth of a sonic well logging marker layer; $T_i$ represents sonic time difference; $\Delta H$ represents a well logging curve data sampling interval; and $T_d$ represents the two-way travel time of a seismic wave.

4. A method for identifying a carbon storage box based on a GAN network of claim 1, wherein a method of obtaining the seismic waveform data of the stable sedimentary area comprises:

based on the post-stack seismic data, calculating the seismic waveform variance attribute data volume:

letting the data of each sampling point in the post-stack seismic data be $S_{ijk}$, p represents a seismic gird wire size, q represents a seismic grid trace number, and k represents a sampling point serial number of a seismic record sampled at 1 ms;

calculating a mean square error of sampling point data in a preset sampling area:

$$Q_{pqk} = \sum_{p-1}^{p+1} \sum_{q-1}^{q+1} \sum_{k-1}^{k+1} \left( S_{pqk} - 1/9 \sum_{p-1}^{p+1} \sum_{q-1}^{q+1} \sum_{k-1}^{k+1} S_{pqk} \right)^2$$

translating the sampling areas vertically and horizontally, transversely calculating the data mean square errors of all the sampling areas to obtain a three-dimensional variance attribute volume; and slicing the three-dimensional variance attribute volume, obtaining the distribution characteristics of variance attribute data on a plane, and taking the area where the variance attribute value is lower than the total energy average value as the sedimentary stable area, wherein data corresponding to the sedimentary stable area is the stable sedimentary background seismic waveform data.

5. A method for identifying a carbon storage box based on a GAN network of claim 1, wherein the background waveform data filling model based on the GAN neural network specially comprises:

a generator and a discriminator;

wherein the generator comprises four groups of down-sampling convolution layers and pooling layers, a full connection layer and four up-sampling convolution layers, and four kinds of convolution kernels with the scale of 5×5 are used in each down-sampling convolution layer; and the discriminator comprises four up-sampling convolution layers.

6. A method for identifying a carbon storage box based on a GAN network of claim 5, wherein a training method of the background wave impedance data filling model based on the GAN neural network comprises:

based on the stable sedimentary background waveform data, generating stable sedimentary background characteristics by the generator;

extracting stable sedimentary background waveform data by the encoder in the generator, specifically, calculating abstract characteristic representation by the four groups of down-sampling convolution layers and pooling layers;

classifying, integrating, and normalizing abstract characteristic representation to retain the resolution and number of characteristic graphs through the full connection layer to obtain a normalized characteristic image;

collecting missing data of the normalized characteristic image by the decoder, specifically, performing weighted up-sampling by the four up-sampling convolution layers to obtain stable sedimentary background characteristics with the same scale as the stable sedimentary background waveform data, namely fine stable sedimentary background seismic waveform data;

inputting the seismic waveform data of the stable sedimentary area and the seismic waveform data of the fine stable sedimentary area, which are not processed by the generator and jointly serve as data to be identified, into the discriminator, wherein the discriminator judges whether the input data is the seismic waveform data of the fine stable sedimentary area and calculates discrimination accuracy;

in the training process, setting an objective function of the background wave impedance data filling model based on the GAN neural network as follows:

$$\min_G \max_D V(D, G) = E_{x \sim P_{data(x)}}[\log D(x)] + E_{v \sim P_v(v)}[\log(1 - D(G(v)))],$$

where, x represents waveform amplitude in the data $P_{data(x)}$ to be identified, v represents a random noise vector, $P_v$ (v) represents the probability distribution of a random noise vector, and is set as Gaussian distribution here, E represents an expected value, log represents taking the logarithm, min represents taking the minimum, max represents taking the maximum, D represents the discriminator, and G represents the generator;

setting an objective function $Obj^D(\theta_D, \theta_G)$ of the discriminator as:

$$Obj^D(\theta_D, \theta_G) = -E_{x \sim P_{data(x)}}[\log D(x)] - E_{z \sim P_z(z)}[\log(1-D(G(v)))],$$

setting an objective function of the generator as:

$$Obj^G = \log(1-D(G(v))),$$

alternately iterating the maximization of the objective function of the discriminator and the minimization of the objective function of the generator until the classification accuracy of the discriminator for the seismic waveform data of the fine stable sedimentary area output by the generator and the seismic waveform data of the stable sedimentary area not processed by the generator is lower than a preset threshold, and obtaining the trained background wave impedance data filling model based on the GAN neural network.

7. A method for intelligently identifying a carbon storage box based on a GAN network of claim 1, wherein a method of obtaining the fine stable sedimentary background seismic waveform data invertomer comprises:

delineating grids with preset sizes based on the sedimentary stable area, and taking each grid node as a virtual well site;

letting an unknown underground wave impedance model parameter m be a g-dimensional space vector $m=\{m_1, \ldots, m_g\}$ based on the stable sedimentary background seismic waveform data;

obtaining the observation data d as a r-dimensional data vector $d=\{d_1, \ldots, d_r\}$ through an earthquake acquisition process;

through a nonlinear function kernel G, establishing an unknown underground wave impedance model parameter, and establishing the relationship between the parameter and the r-dimensional data vector to obtain a forward model:

$$d=G(m)+n$$

where, $n=\{n_1, \ldots, n_r\}$ represents random noise independent of the underground wave impedance model parameter m, which obeys Gaussian distribution;

building an inversion objective function based on the forward model:

$$\min F[d, G(m)] = \min \|d, G(m)\|^2_2,$$

where, F is a mean square error between the observation data d and the prediction data G(m);

performing linearized solution on the inversion objective function;

performing Taylor expansion on the forward model and omitting higher-order terms of more than quadratic to obtain a brief expression of prediction data:

$$\Delta G(m)=G(m)-G(m^0)=A\Delta m=A(m-m^0),$$

where, $m^0$ represents the initial model established according to prior information, A is a Jacobian matrix, and the element of A is first-order partial differential $\partial G_i/\partial m_j$;

letting $d_0=G(m_0)+\xi\Delta d=d-d_0$, then the iterative equation of the forward model is:

$$m^{t+1}=m^t+\Delta m$$

where, $m^k$ represents the forward model after iteration t times, $m^{k+1}$ represents the forward model after iteration k+1 times, and $d_0$ is the noise-adding prediction data;

obtaining pre-stack depth and an offset seismic profile d through one seismic acquisition process, assuming that inversion depth domain model parameters have prior probability distribution P(M=m), according to Bayesian formula, the probability distribution is as follows:

$$P(M=m \mid D=d) = \frac{P(D=d \mid M=m)P(M=m)}{P(D=d)},$$

the probability distribution of adding random noise is follows:

$$P(D=d \mid M=m) =$$

$$P(n) = \frac{1}{(2\pi)^{\frac{n}{2}}|\det C_n|^{\frac{1}{2}}} \exp\{-[d-G(m)]^T C_n^{-1}[d-G(m)]\},$$

where, $C_n$ is a noise covariance matrix, $C^{-1}_n$ is the inversion operation of the noise covariance matrix, and det is the determinant of the corresponding matrix;

n is noise and obeys Gaussian distribution, the average value is 0, $C_n$ is an equivalent diagonal matrix, and diagonal elements are the variance $\sigma^2_n$ containing noise of data center, then the probability distribution of adding the random noise is deformed as follows:

$$P(D=d \mid M=m) = \prod \frac{1}{(2\pi)^{\frac{n}{2}}\sigma_n} \exp\{-\sigma^2_n \sum [d-G(m)]^2\},$$

for the prior probability distribution P(M=m) of the inversion depth domain model parameter, setting the initial model $m^0$, there is $m=m^0+\Delta m$, and the probability distribution of the equivalent depth domain model is: $P(M=m)=P(m=m^0+\Delta m)=P(\Delta m=m-m^0)$;

letting the probability distribution of the equivalent depth domain model obey Gaussian distribution, and the probability distribution of the depth domain model with the random noise added is:

$$P(M-m) = \frac{1}{(2\pi)^{\frac{n}{2}}|\det C_{\Delta m}|^{\frac{1}{2}}} \exp\{-[m-m^0]^T C_{\Delta m}^{-1}[m-m^0]\}$$

assuming that the average value of the depth domain model parameters is equal to an initial model $m^0$, they do not affect each other, and there is a simplified probability distribution of the depth domain model, which is as follows:

$$P(M-m) = \frac{1}{(2\pi)^{\frac{n}{2}}\sigma_m} \exp\{-\sigma_m^2[m-m^0]\},$$

where, $\sigma_m$ represents the variance value of the real model relative to a given initial model;
a denominator $P(D=d)$ in the probability distribution deformation with the random noise added depends on data acquisition and processing, and is set as a constant, and maximizing posterior probability is equivalent to maximizing a numerator, which maximizes posterior probability distribution:

$$P(M=m \mid D=d) =$$
$$\prod \frac{1}{(2\pi)^n \sigma_n \sigma_m} \exp\{-\sigma_n^{-2} \sum [d-G(m)]^2 - \sigma_m^2 \sum [m-m^0]^2\},$$

making the maximum equivalent formula of posterior probability distribution as:

$$F(m) = \sigma_n^{-2} \Sigma[d-G(m)]^2 + \sigma_m^2 \Sigma[m-m^0]^2 \to 0,$$

letting the partial derivative of the model parameter m equal to zero, and $G(m)=G(m^0+A\Delta m)$, $\Delta m=m-m^0$, thereby obtaining the matrix equation:

$$\frac{\partial F(m)}{\partial m} = \sigma_n^{-2}[d-G(m^0)-A\Delta m]IA - \sigma_m^2 I\Delta m = 0$$

$$dI\sigma_n^{-2}A - \sigma_m^2 I\Delta m - G(m^0)\sigma_n^{-2} IA - A\Delta m I\sigma_n^{-2} A = 0,$$
where, $$A_{ij} = \frac{\partial G_i}{\partial m_j},$$

I is an identity matrix, $\Delta m$ is a wave impedance iterative matrix, arranging to obtain the basic formula of random inversion as follows:

$$[d-G[m^0]]A = [AA^T + \sigma_n^2 \sigma_m^{-2} I]\Delta m \quad \Delta m = [AA^T + \sigma_n^2 + \sigma_{2m}^{-} I]^{-1} A^T [d-G(m^0)],$$

the iterative formula of the basic formula of random inversion is: $m^{k+1} = m^k + \Delta m$;
where, $G[m^0]$ is a depth domain synthetic seismic record formed by a parametric model, and d is observation data;

updating the parameters of the unknown underground wave impedance model through continuous iteration until positive and negative shocks occur in $\Delta m$, where, m is low frequency wave impedance inversion data;
based on the correlation between the plane coordinates of the virtual well site and the plane coordinates of the seismic data, further determining the one-to-one correspondence between the virtual well and the low-frequency wave impedance inversion data, and then assigning the low frequency wave impedance inversion data beside the virtual well to the virtual well to obtain the wave impedance data of the virtual well site; and
based on the wave impedance inversion data volume, extracting the wave impedance data of the virtual well site, setting a calculation area as the whole range of a work area in a geological framework according to the interpolation calculation of all virtual well wave impedance data in the time window range defined by a stratigraphic framework to obtain a fine stable sedimentary background seismic waveform data invertomer.

8. A method for identifying a carbon storage box reservoir bed based on a GAN network of claim 1, wherein a method of obtaining the three-dimensional wave impedance prediction data volume comprises:
based on an acoustic time difference curve in well logging data, obtaining the propagation velocity of seismic waves by unit conversion;
determining the main frequency of an earthquake according to the frequency spectrum peak of the seismic waveform data of the target horizon in the post-stack seismic data;
calculating the wavelength of the seismic wave:

$$L = v/f_{main}$$

where, L represents the wavelength of the seismic wave, v represents the velocity of the seismic wave in a target interval, and $f_{main}$ represents the main frequency of the seismic wave;
according to the coordinates of the well site and the plane coordinates of the seismic data, matching the well logging acoustic time difference curve with the near-well seismic waveform corresponding to the density period;
taking the half-wavelength $$\frac{L}{2}$$

of the seismic wave as the length of a sliding time window and the step length as 1, extracting all seismic waveform amplitude data points in the sliding time window as seismic waveform amplitude samples;
extracting multiple samples in the same well to obtain a seismic waveform amplitude sample set;
inputting the seismic waveform amplitude sample set into a wave impedance value prediction model based on a cross-well seismic waveform structure to obtain a three-dimensional wave impedance prediction data volume;
wherein the wave impedance value prediction model based on the cross-well seismic waveform structure comprises an input layer, a hidden layer and an output layer;

the number of neurons in the input layer is the same as the number of data points in the seismic waveform amplitude sample set;

the hidden layer is built based on a fully connected structure:

the input of the p-th neuron in the Layer-th layer is equal to the neuron in the Layer-1-th multiplied by the weight plus an offset vector:

$$Z^{Layer}_p = \Sigma_q \text{weight}^{Layer}_{pq} a^{Layer-1}_q + b^{Layer}_p,$$

the output of the p-th neuron in the Layer-th layer is expressed as:

$$a^{Layer}_p = \sigma(\Sigma_q \text{weight}^{Layer}_{pq} a^{Layer-1}_q + b^l_p),$$

$\sigma$ represents an activation function, $a^{Layer-1}_k$ represents the output of the q-th neuron in the Layer-1-th layer, and $\text{weight}^{Layer}_{pq}$ represents the connection weight between the p-th neuron in the Layer-th layer and the q-th neuron in the previous layer;

$$\sigma(\varepsilon) = \begin{cases} \varepsilon, & \varepsilon \geq 0 \\ p\varepsilon, & \varepsilon < 0 \end{cases}$$

p represents a neural network hyperparameter the number of the neurons in the output layer is the same as that in the input layer, and the output layer outputs wave impedance values corresponding to the seismic waveforms, which are merged into the three-dimensional wave impedance prediction data volume.

9. A method for intelligently identifying a carbon storage box based on a GAN network of claim 8, wherein, a training method of the wave impedance value prediction model based on the cross-well seismic waveform structure comprises:

obtaining a training data set and performing forward propagation:

$$z^l = w^l a^{l-1} + b^l a^l = \sigma(z^l),$$

where, the cost function is:

$$C = \frac{1}{2}\sum_j (y_j - a^l_z)^2,$$

$y_j$ represents a true value;

the error in the forward calculation of each layer of neural network is:

$$\delta^l_j = \frac{\partial C}{\partial z^l_j} = \sum_k \frac{\partial C}{\partial z^{l+1}_k} \cdot \frac{\partial z^{l+1}_k}{\partial a^l_j} \cdot \frac{\partial a^l_j}{\partial z^l_j} = \sum_k \delta^{l+1}_k \frac{\partial(w^{l+1}_{kj} a^l_j + b^{l+1}_k)}{\partial a^l_j} \cdot \sigma'(z^l_j) = \sum_k \delta^{l+1}_k \cdot w^{l+1}_{kj} \cdot \sigma'(z^l_j) = ((w^{l+1})^T \delta^{l+1}) \odot \sigma'(z^l),$$

the gradient of weight, that is, the partial derivative of the objective function to the weight, is:

$$\frac{\partial C}{\partial w^l_{jk}} = \frac{\partial C}{\partial z^l_j} \cdot \frac{\partial z^l_j}{\partial w^l_{jk}} = \delta^l_j \cdot \frac{\partial(w^l_{jk} a^{l-1}_k + b^l_j)}{\partial w^l_{jk}} = a^{l-1}_k \delta^l_j$$

the gradient of the offset, that is, the derivative of the offset by the objective function:

$$\frac{\partial C}{\partial b^l_j} = \frac{\partial C}{\partial z^l_j} \cdot \frac{\partial z^l_j}{\partial b^l_j} = \delta^l_j \cdot \frac{\partial(w^l_{jk} a^{l-1}_k + b^l_j)}{\partial b^l_j} = \delta^l_j,$$

the error in forward propagation is:

$$\delta^L = \nabla_a C \odot \sigma'(Z^L),$$

the error in back propagation is:

$$\delta^l = ((w^{l+1})^T \delta^{l+1}) \odot \sigma'(z^l),$$

updating parameters by a gradient descending method:

$$w^l \to w^l - \frac{\eta}{m}\sum_x \delta^{x,l}(a^{x,l-1})^T$$

$$b^l \to b^l - \frac{\eta}{m}\sum_x \delta^{x,l},$$

repeatedly iterating until the error is lower than the preset error threshold or preset iteration times are reached, and obtaining the trained wave impedance value prediction model based on the cross-well seismic waveform structure.

\* \* \* \* \*